United States Patent [19]
Fukao et al.

[11] Patent Number: 5,924,107
[45] Date of Patent: Jul. 13, 1999

[54] INFORMATION-PROCESSING APPARATUS HAVING DOCUMENT-EDITING FUNCTION

[75] Inventors: Itaru Fukao, Kawasaki; Hiroaki Abe; Yuji Kubota, both of Sapporo; Yoshio Nishiyama, Kawasaki; Kazunori Nomura, Sapporo, all of Japan

[73] Assignee: Fujitsu Ltd., Kawasaki, Japan

[21] Appl. No.: 08/939,713

[22] Filed: Sep. 29, 1997

Related U.S. Application Data

[63] Continuation of application No. 08/371,795, Jan. 12, 1995, abandoned.

[30] Foreign Application Priority Data

Jun. 27, 1994 [JP] Japan ................................. 6-145131

[51] Int. Cl.$^6$ .................................................. G06F 17/24
[52] U.S. Cl. ............................................................ 707/530
[58] Field of Search ................................. 707/530, 500, 707/501, 506, 507, 514–516

[56] References Cited

U.S. PATENT DOCUMENTS

| | | | |
|---|---|---|---|
| 4,538,225 | 8/1985 | Banks et al. | 707/530 |
| 4,633,430 | 12/1986 | Cooper | 707/500 |
| 4,723,210 | 2/1988 | Barker et al. | 707/514 |
| 4,723,211 | 2/1988 | Barker et al. | 707/514 |
| 4,974,194 | 11/1990 | Barker et al. | 707/540 |
| 4,996,662 | 2/1991 | Cooper et al. | 707/1 |
| 5,146,550 | 9/1992 | Noguchi et al. | 707/516 |
| 5,355,472 | 10/1994 | Lewis | 707/101 |
| 5,398,334 | 3/1995 | Topka et al. | 707/206 |
| 5,408,599 | 4/1995 | Nomura et al. | 707/516 |

FOREIGN PATENT DOCUMENTS

| | | |
|---|---|---|
| 62-84337 | 4/1987 | Japan . |
| 2-89161 | 3/1990 | Japan . |
| 5-67090 | 3/1993 | Japan . |
| 5-324295 | 12/1993 | Japan . |

OTHER PUBLICATIONS

Walter, Documentum: Open Approach to Automating Work Flow and Management of Long Documents, The Seybold Report on Publishing Systems, v.23, n.7, Dec. 1, 1993, pp. 3–13.

Pinto et al., HyDE: A Hypermedia Document Editor Based on OLE Technology, Multimedia 1994 Conference, May 15, 1994, pp. 375–381.

Mendelson, Word for Windows 6.0 Gest Psychic, PC Magazine, v.13, n.2, Jan. 25, 1994, pp. 37–39.

*Primary Examiner*—Anton Fetting
*Attorney, Agent, or Firm*—Staas & Halsey

[57] ABSTRACT

An information-processing apparatus for document editing. The apparatus has multiple editors for editing documents according to the individual document type. An editing operation interlocking work identifier analyzes the meaning of a work corresponding to a give editing operation on a document. Editing operations for the documents, and information about associated works, are defined in an editing operation interlocking work correlating table. The associated work is done in parallel with, or later than, an editing operation for the document. The editing operation interlocking work identifier refers to the correlating table. A process starting controller refers to an interlocking work starting process correlating table in which information about the associated works and starting processes are defined.

10 Claims, 39 Drawing Sheets

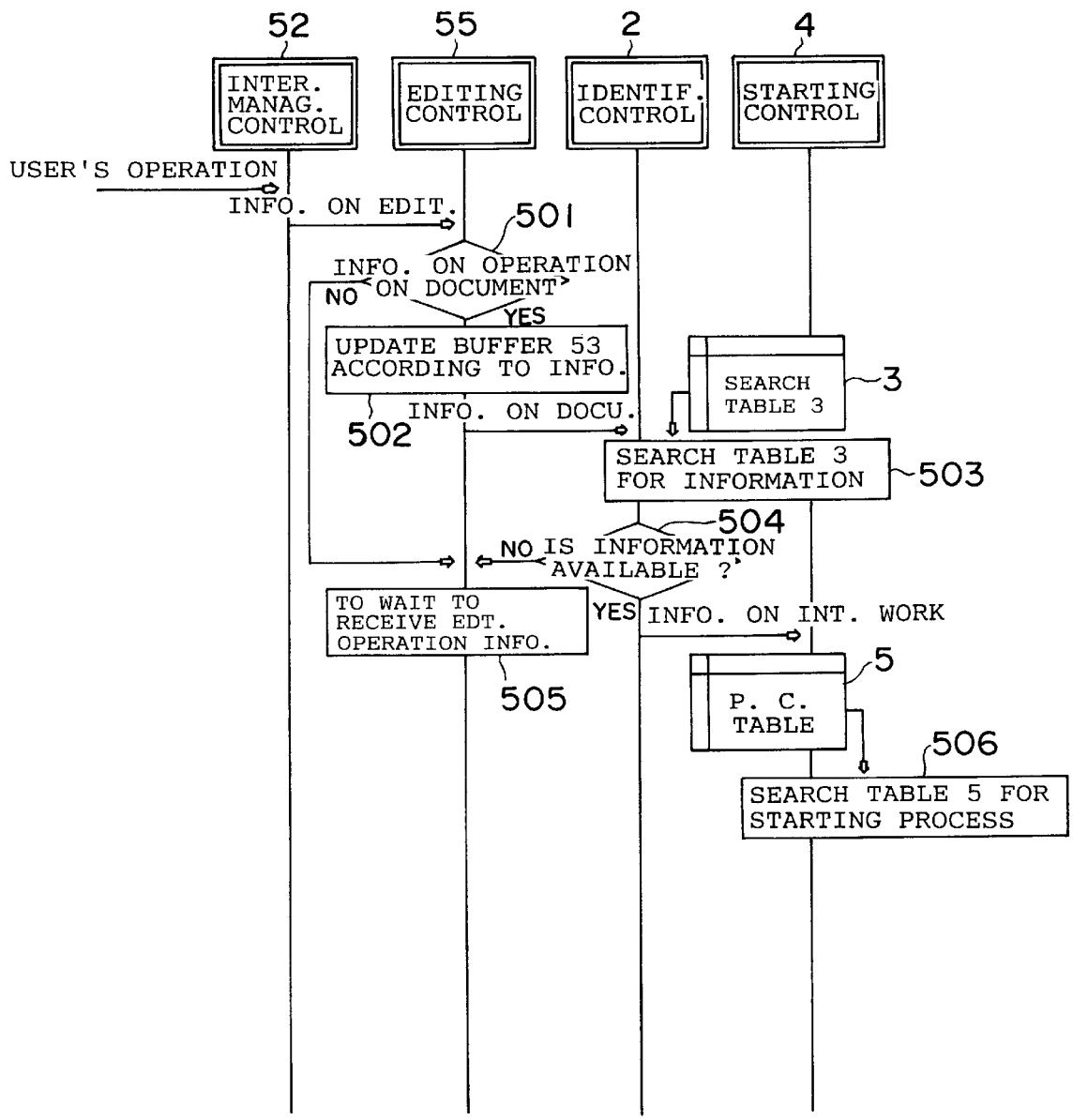

INFORMATION-PROCESSING APPARATUS HAVING DOCUMENT-EDITING FUNCTION

This application is a continuation of application Ser. No. 08/371,795, filed Jan. 12, 1995, now abandoned.

BACKGROUND OF THE INVENTION

The present invention relates to an information-processing apparatus having a function of editing document (i.e., a handwritten, typewritten, or printed sheet or sheets of paper containing data).

As the performance of computer hardware has been improved and editing systems such as editors have become widespread, more document has been created in various transactions with the aid of computers.

Plural documents used in a series of transactions are often interrelated, according to their contents. For example, when a first document is being created, using an editor, the necessity of editing a second document associated with the first document may arise. When certain items contained in a first document are being erased, certain documents associated with the erased items may be required to be erased.

In the prior art document creation aid system making use of a computer, however, it is necessary to start an appropriate editor whenever a user wants to create a separate document. The operation interlinking an editing operation on one document and the next operation has not been assisted. Therefore, if plural interrelated documents exist, a command is executed whenever a new document is created. Alternatively, an editor selected from a menu must be executed. Thus, it cannot be said that documents are created efficiently.

With respect to this problem, new software has been developed in recent years. In particular, the relation between plural documents is managed, using identifying marks or icons in the documents. After an editor for some document is activated, an editor for other associated document is started.

In this technique, however, it is also necessary for the user to define the relation between the documents as one editing operation. Hence, this technique merely dispenses with the need to start the associated document outside the editor, compared with the preceding techniques.

SUMMARY OF THE INVENTION

It is an object of the present invention to provide an information-processing apparatus capable of creating documents in conformity with flow of operations to be processed by a user, by causing a computer to perform a series of operations for creating documents. The meaning of the editing operation performed by an editor during the creation of each document is correlated with the meaning of the series of operations performed by the computer. The next operation which becomes necessary according to the contents of the editing operation is judged. Processes performed by the computer for this aid to creation of documents are successively selected and activated.

According to the present invention, editors for editing plural forms of document are provided according to these forms of document. Also, an editing operation interlocking work identifying-and-controlling portion is provided to analyze the meaning of an operation performed according to a certain editing operation on a document. Editing operations for the documents and associated work information processed in parallel with or later than the editing operations are defined in an editing operation interlocking work correlating table. The editing operation interlocking work identifying-and-controlling portion refers to this correlating table.

Furthermore, an interlocking work starting process correlating table which defines associated work information and starting processes is provided. A process starting control portion refers to this interlocking work starting process correlating table.

The meaning of an editing operation performed by a user on a document is analyzed by the editing operation interlocking work identifying-and-controlling portion. Associated works are performed in parallel with or subsequently to the editing operation. Information about the associated works is read from the editing operation-interlocking work correlating table and sent to the process starting control portion.

The process starting control portion receiving this information about the associated works refers to the interlocking work starting process correlating table in which the correlated work information and starting processes are defined. Then, the starting control portion extracts one starting process and issues a STARTING instruction.

In this series of processes, an associated process is started in connection with the meaning of the user's operation on the document. Therefore, the user can shift directly to the next associated work according to the result of the editing operation without the need to start a separate associated document during the editing of the document or to specify associated documents individually during the editing operation within the document.

Other objects and features of the invention will appear in the course of the description thereof, which follows.

BRIEF DESCRIPTION OF THE DRAWINGS

FIG. 5 is a flowchart illustrating a sequence of operations of Example 1 of the invention;

DESCRIPTION OF THE PREFERRED EMBODIMENTS

Before describing the preferred embodiments of the invention in detail, the invention is briefly described with reference to the accompanying drawings.

Figure 1:
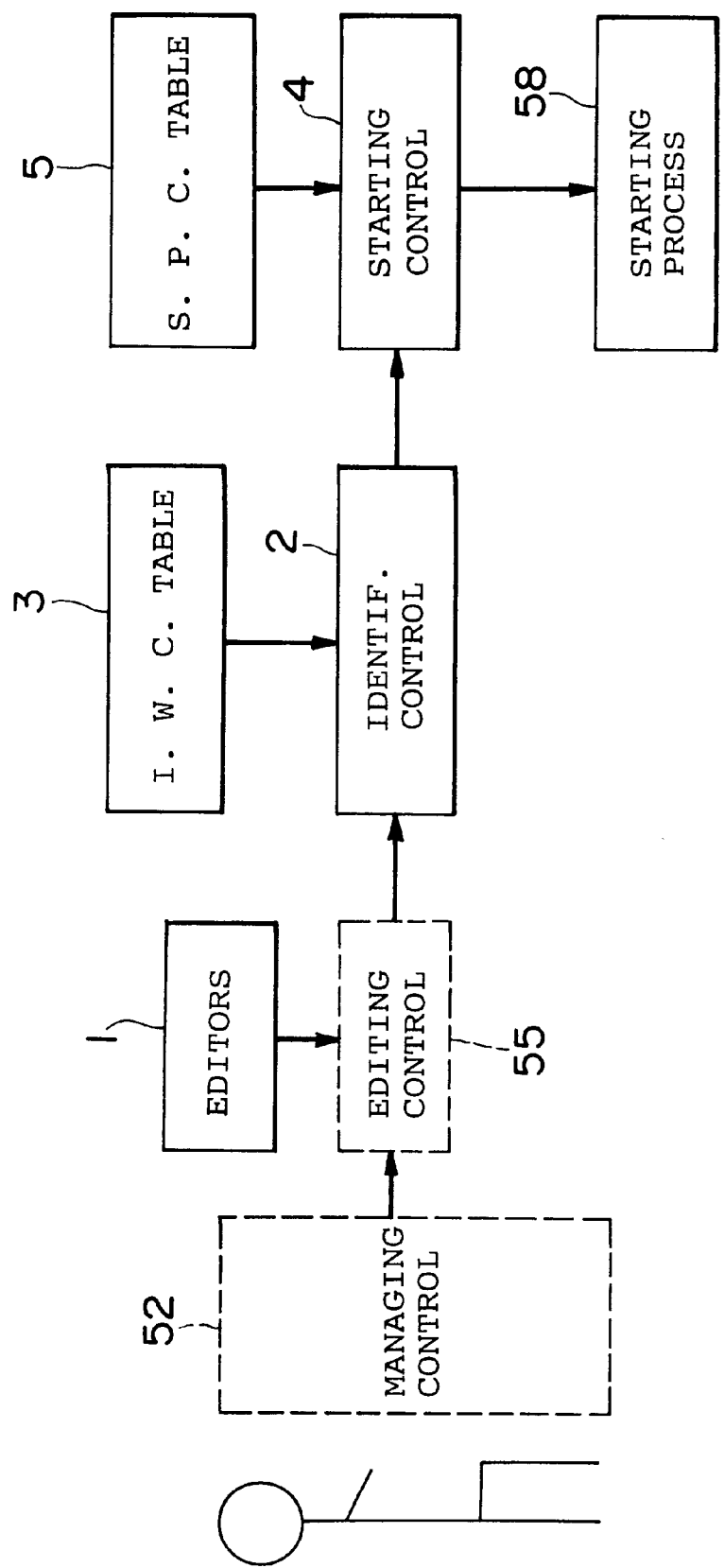
FIG. 1 is a block diagram illustrating the principle of the present invention.

Referring to FIG. 1, in a first structure of the present invention, a set of editors 1 for editing plural types of documents is provided according to these types. Also, an editing operation interlocking work identifying-and-controlling portion 2 for analyzing the meaning of a work done according to a given editing operation on a document is provided. Editing operations on documents and information about associated works are defined in an editing operation interlocking work correlating table 3, the associated works being processed in parallel with or later than the editing operations according to these editing operations. The editing operation interlocking work identifying-and-controlling portion 2 refers to the editing operation interlocking work correlating table 3. The information about the associated works and starting processes are defined in an interlocking work starting process correlating table 5. A process starting control portion 4 refers to the process correlating table 5.

A second structure of the invention is similar to the aforementioned first structure except that an editor starting condition table 6 is provided together with the above-described interlocking work starting process correlating table 5. Modes in which editors are started are registered in the editor starting condition table 6. After given editing operations are performed on the editors 1, if the process starting control portion 4 judges that another associated document is required to be edited, then conditions in which the editors are started are read from the editor starting condition table 6, and editing of this associated document is carried out.

A third structure of the invention is similar to the second structure except for the following points. The process starting control portion 4 has a process starting pattern table 8 and a process starting pattern control portion 7. Information about patterns in which processes are started is registered in the pattern table 8. The process starting pattern control portion 7 informs the starting control portion 4 of a process starting pattern according to the information registered in the process starting pattern table 8. Where starting processes for editors for plural documents are defined in the interlocking work starting process correlating table 5, the process starting pattern control portion 7 judges whether all the defined starting processes are started simultaneously or selectively.

A fourth structure of the invention is similar to the second structure described above except that the editing operation interlocking work identifying-and-controlling portion 2 has a graphic box editing operation identifying portion 9 for identifying placement of graphic boxes previously established within the editors 1 and editing operations about the displayed graphic boxes on displayed images for document editing.

A fifth structure of the invention is similar to the second structure except that the editing operation interlocking work identifying-and-controlling portion 2 has a character array kind identifying portion 10 for judging the kinds of character arrays on a document which has been edited.

A sixth structure of the invention is similar to the aforementioned fifth structure except that the character array kind identifying portion 10 has a character array kind combination condition table 11 and a character array kind combination condition collating portion 12. Patterns of combinations of character arrays produced before and after an editing operation are defined in the condition table 11. The character array kind combination condition collating portion 12 transfers control to the process starting control portion 4 if and only if the conditions defined in the condition table 11 are satisfied.

A seventh structure of the invention is similar to the second structure described above except that the editing operation interlocking work identifying-and-controlling portion 2 has a graphic button operation identifying portion 13 for defining graphic buttons which are placed on an image displayed on a display screen. When the coordinates of a certain region on any one of graphic buttons is indicated, the graphic button performs a certain function.

An eighth structure of the invention is similar to the first structure except that an associated document erasure condition table 14 is created, corresponding to the interlocking work starting process correlating table 5. The erasure condition table 14 defines conditions under which another created document associated with a document to be edited is erased.

A ninth structure of the invention is similar to the first structure except that an associated document modification condition table 15 is created, corresponding to the interlocking work starting process correlating table 5. The erasure condition table 14 defines conditions under which another created document associated with a document to be edited is modified.

A tenth structure of the invention is similar to the first structure except that the process starting control portion 4 has an interlocking operation mode control portion 17 and an interlocking operation mode managing table 16. The interlocking operation mode control portion 17 indicates whether the process starting control portion 4 starts another process associated with the document now being edited. The interlocking operation mode managing table 16 determines whether another associated process should be started in step with the editing operation on a document.

In the first structure described above, the editing operation interlocking work identifying-and-controlling portion 2 analyzes the meaning of an editing operation performed by a user on a document. Information about an associated work which is performed in parallel with or later than the editing operation is read from the editing operation interlocking work correlating table 3. The information about this associated work is sent to the process starting control portion 4.

The process starting control portion 4 receiving this information about the associated work refers to the interlocking work starting process correlating table 5, extracts a starting process 58, and issues an instruction for starting the process 58.

The associated process is started in connection with the meaning of the user's operations for a document by the above-described series of steps and so the user can shift directly to the next associated work according to the result of the editing operation without the need to start a separate associated document during the editing of the document or to specify associated documents individually during the editing operation within the document.

By combining any one of the second through ninth structures with the first structure, a kind of editing operation and associated next operation can be assisted by the computer.

In the tenth structure, the user can previously determine whether various kinds of assisting processing should be performed in step with the editing of the document as described above, by the use of the interlocking operation mode managing table 16. Consequently, only editing operations on a single document can be performed in the same manner as in the prior art techniques.

Specific examples of the invention are described now.

EXAMPLE 1

Figure 4:
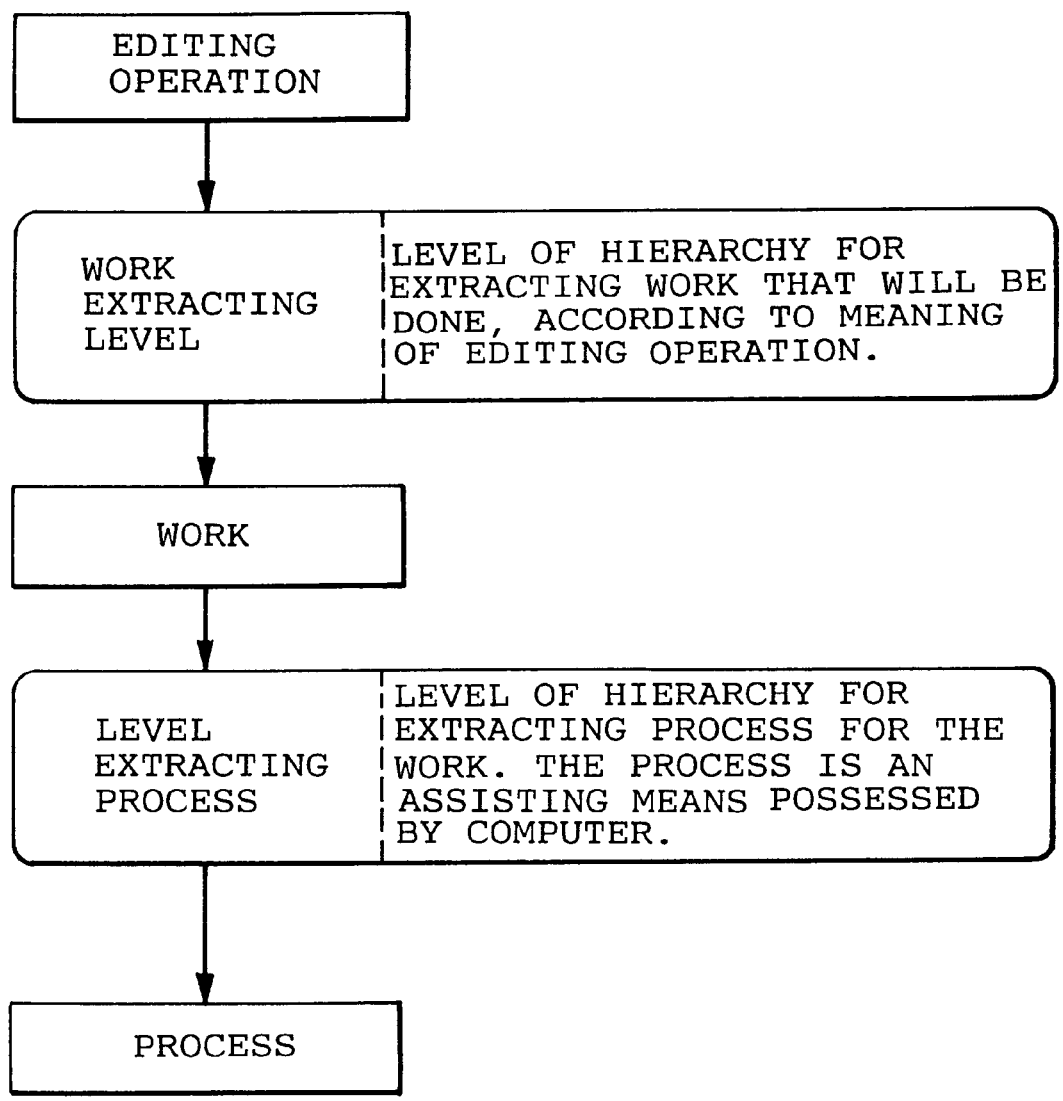
FIG. 4 is a flowchart conceptually illustrating the processing of the invention.

The concept of the present invention is illustrated in FIG. 4. A user will do a "work" in a hierarchy according to the meaning of an "operation for editing a document". In connection with the resulting work, a computer holds a process as an assisting means. This process is treated in a hierarchy which is discriminated from the former hierarchy. In this way, the process acting as the assisting means operating in conformity with the meaning of the editing operation is directly coupled to the work.

Figure 2:
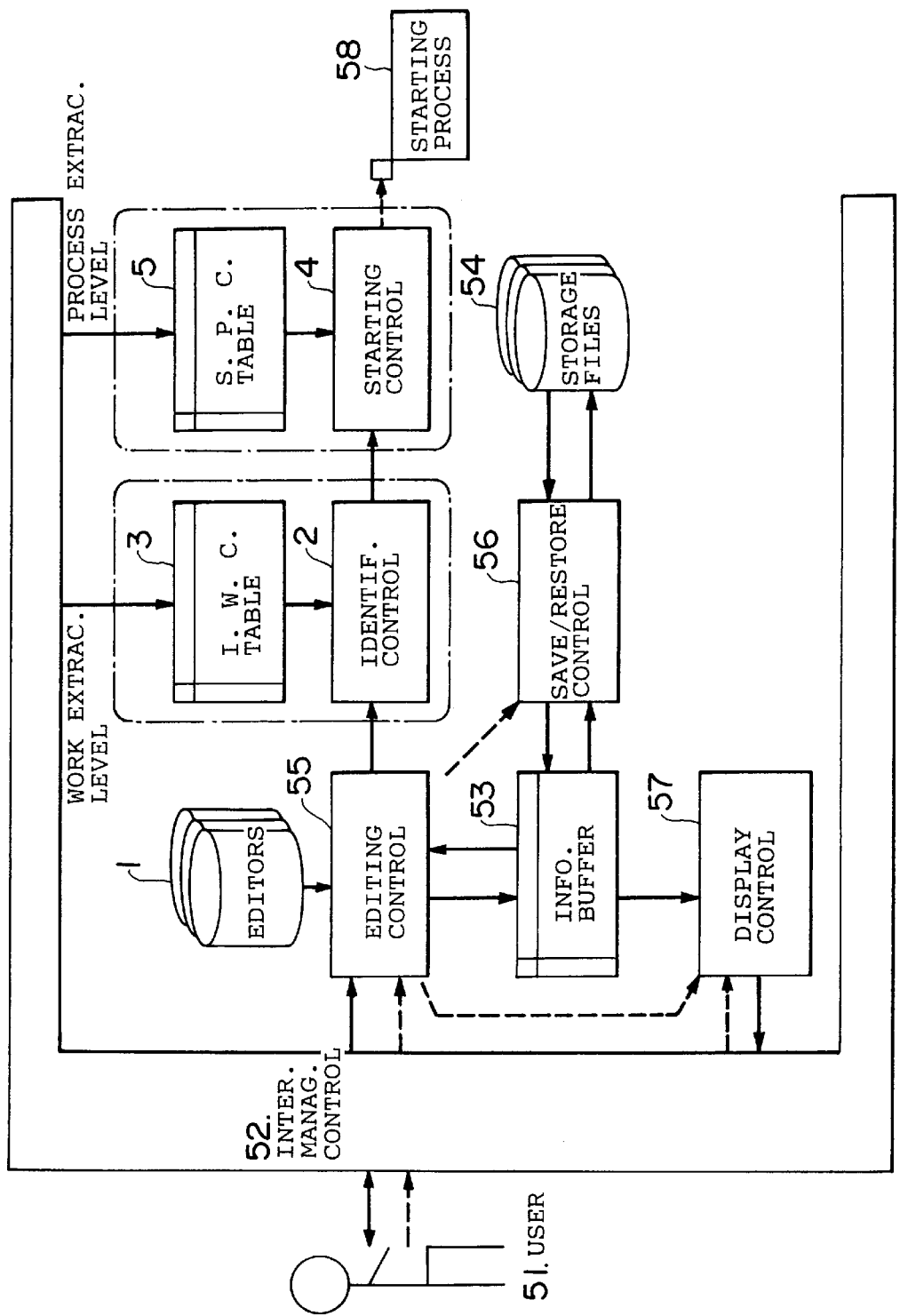
FIG. 2 is a block diagram of the system structure of Example 1 of the invention.

FIG. 2 shows the structure of the system of the present example. The user performing a work is indicated by reference numeral 51. An interactive managing-and-controlling portion 52 controls interactive processing with the user 51 via a keyboard 35 or a mouse 36 (see FIG. 3).

Figure 3:
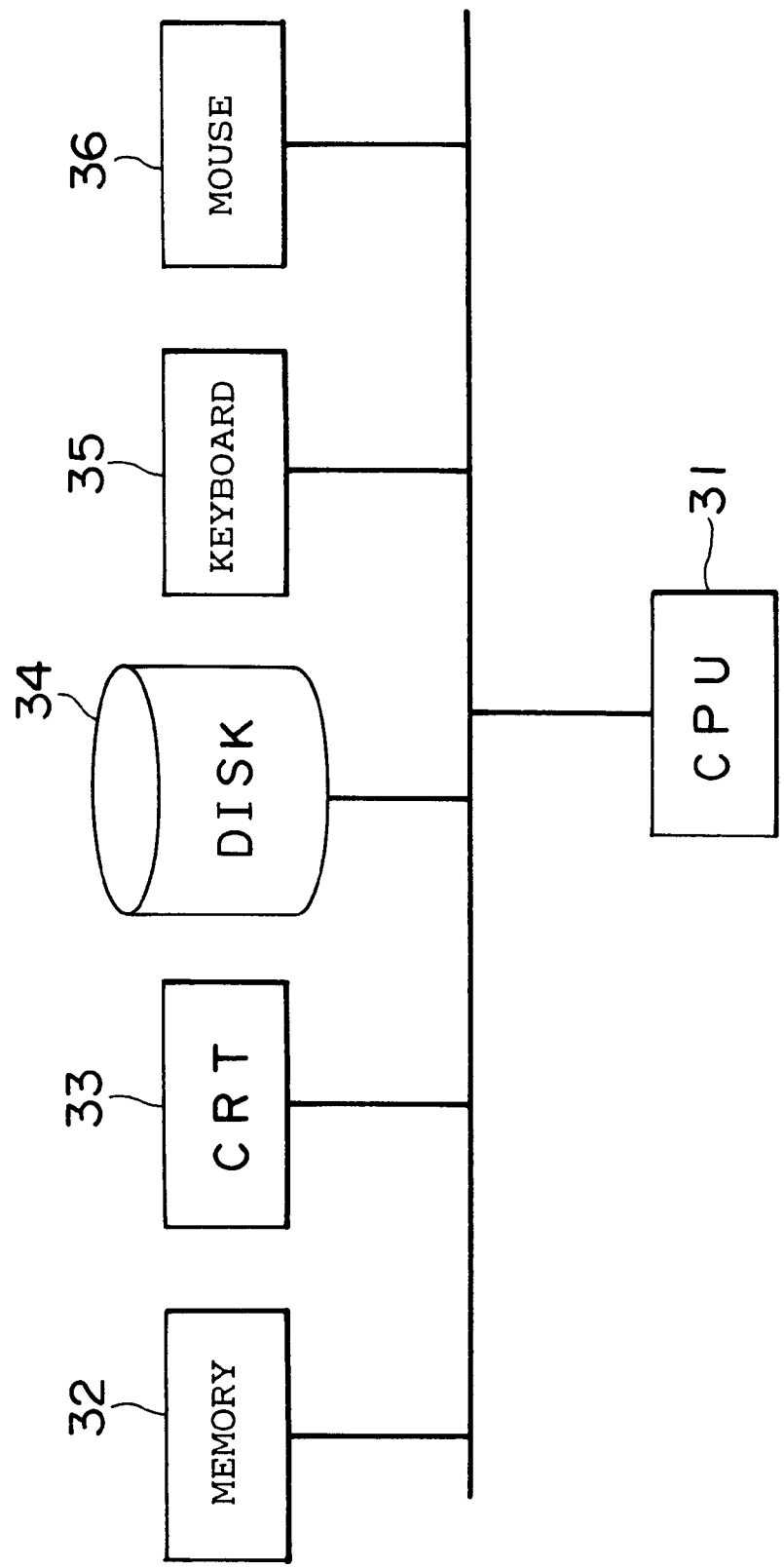
FIG. 3 is a block diagram of the hardware structure of Example 1 of the invention.

FIG. 3 shows the minimum hardware structure necessary to realize the various functions described above.

The editors 1 for editing documents assist the user 51 in editing documents through the interactive managing-and-controlling portion 52.

An editing information buffer 53 acts to store information used during editing in a memory 32 (see FIG. 3). Documentary information edited by the present system is stored in editing information storage files 54.

When a request for editing documents is received from the user 51, a document editing control portion 55 informs the editing information buffer 53 of requisite modifying processing and informs the editing operation interlocking work identifying-and-controlling portion 2 of the request for editing documents from the user 51.

If a request for saving or restoring the results of editing operations is received from the user 51, a file saving/restoring control portion 56 causes the document editing control portion 55 to effect saving or restoration on the editing information storage files 54.

The editing operation interlocking work identifying-and-controlling portion 2 serves to judge the requisite assisting work by collating the editing operation notified from the document editing control portion 55 with the editing operation interlocking work correlating table 3. This correlating table 3 is organized as illustrated in FIG. 6(b). That is, information about editing operation and contents of the interlocking operations are registered in pairs.

The process starting control portion 4 receives information about an assisting operation from the editing operation interlocking work identifying-and-controlling portion 2, collates the received information with the interlocking work starting process correlating table 5, and starts a new process (starting process 58) for assisting this work.

Figure 7:
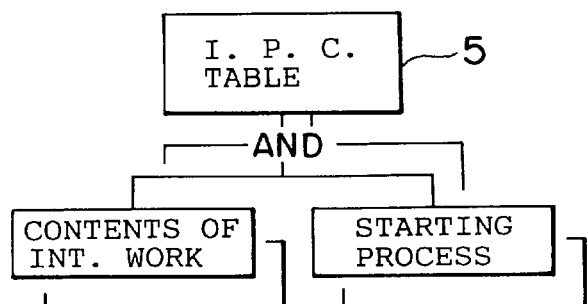
FIG. 7 is a block diagram of an interlocking work starting process correlating table used in Example 1.

The interlocking work starting process correlating table 5 is organized as illustrated in the table of FIG. 7. That is, in this table, the contents of interlocking works and corresponding starting processes are registered in pairs.

When a request for effecting editing is given from the user 51, a screen image display control portion 57 converts the modified contents of the editing information buffer 53 into a format adapted for providing a display on a CRT 33, via the interactive managing-and-controlling portion 52.

Almost all of the functional blocks shown in FIG. 2 are realized by carrying out instructions or data stored in the memory 32 under the control of a CPU 31. The procedure for processing of the present invention is next described by referring to FIGS. 5–7.

Referring to FIG. 5, the user 51 operates the keyboard 35 or the mouse 36 for the document editors 1. Information about the operation of the user is transferred as editor operation information from the interactive managing-and-controlling portion 52 to the document editing control portion 55. The starting process 58 is found via the editing operation interlocking work identifying-and-controlling portion 2 and also via the process starting control portion 4.

In FIG. 5, the components surrounded by double frames are the same as the counterparts shown in FIG. 2.

Figure 6A:
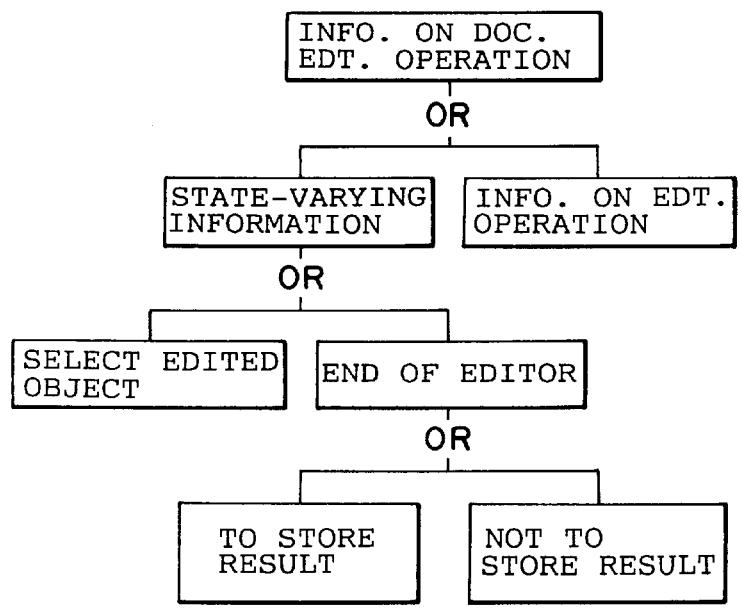
FIG. 6(a) is a block diagram showing the data structure for information about editor operations used in Example 1.
Figure 6B:
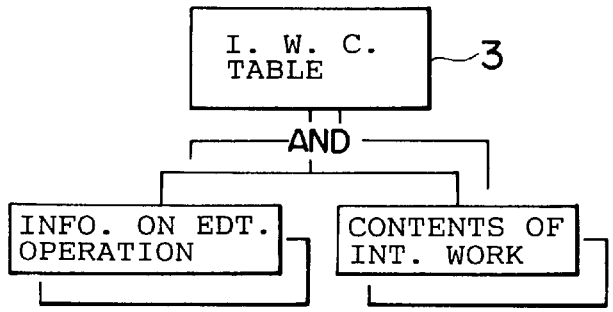
FIG. 6(b) is a block diagram showing the structure of an editing operation interlocking work correlating table used in Example 1.

FIG. 6(a) shows the data structure regarding information about editing operations. FIG. 6(b) shows the structure of the editing operation interlocking work correlating table 3. FIG. 7 shows the structure of the interlocking work starting process correlating table 5.

In the present example, when the user 51 performs an operation on the document editors 1, using the keyboard 35 or the mouse 36, information about the operation is sent to the document editing control portion 55 through the interactive managing-and-controlling portion 52. As shown in FIG. 6(a), the information about the operation on the editors includes state-varying information for varying the states of the editors and information about an editing operation for editing graphics or character arrays on a document. If the information about the operations on the editors is the information about operations on documents (step 501), the document editing control portion 55 reflects the contents of the editing operation in the editing information buffer 53 (step 502). Then, in order to extract an interlocking operation corresponding to the editing operation, the information about the editing operation is sent to the editing operation interlocking work identifying-and-controlling portion 2.

The editing operation interlocking work identifying-and-controlling portion 2 searches the editing operation interlocking work correlating table, using the editing operation information sent from the document editing control portion 55 as a search key, according to the relation between the editing operation information and the contents of the interlocking work defined in the editing operation interlocking work correlating table 3 (step 503). Thus, a work which should interlock with the editing operation performed by the user 51 can be extracted as contents of the interlocking work.

If the information about the interlocking work is absent (step 504), the document editing control portion 55 is instructed to wait to receive information about another editor operation (step 505).

If the result of the decision made in step 504 is that information about an interlocking work is present, then the contents of the extracted interlocking work are transferred to the process starting control portion 4 to find the assisting process (the starting process 58) on the computer which corresponds to the interlocking work.

The process starting control portion 4 searches the interlocking work starting process correlating table 5, using the contents of the interlocking work as a search key. The relation between the contents of the interlocking work and the starting process assisted in the computer is defined in the correlating table 5. In this way, the kind of the starting process 58 is judged and started (step 506).

In the description made thus far, it is assumed that the editor operation information sent from the interactive managing-and-controlling portion 52 is information about an editing operation. As shown in FIG. 6(a), the information about an editor operation can be information for varying the states, in addition to information about an editor operation. The "information for varying the states" can have either an "edited object-selecting mode" or an "editing ending" mode. In the editing ending mode, either an "editing result storage ending" mode in which after the result of editing are stored, the editors are ended or an "editing result non-stored ending" mode in which the editors are ended without storing the results of the editing is selected.

EXAMPLE 2

Figure 8:
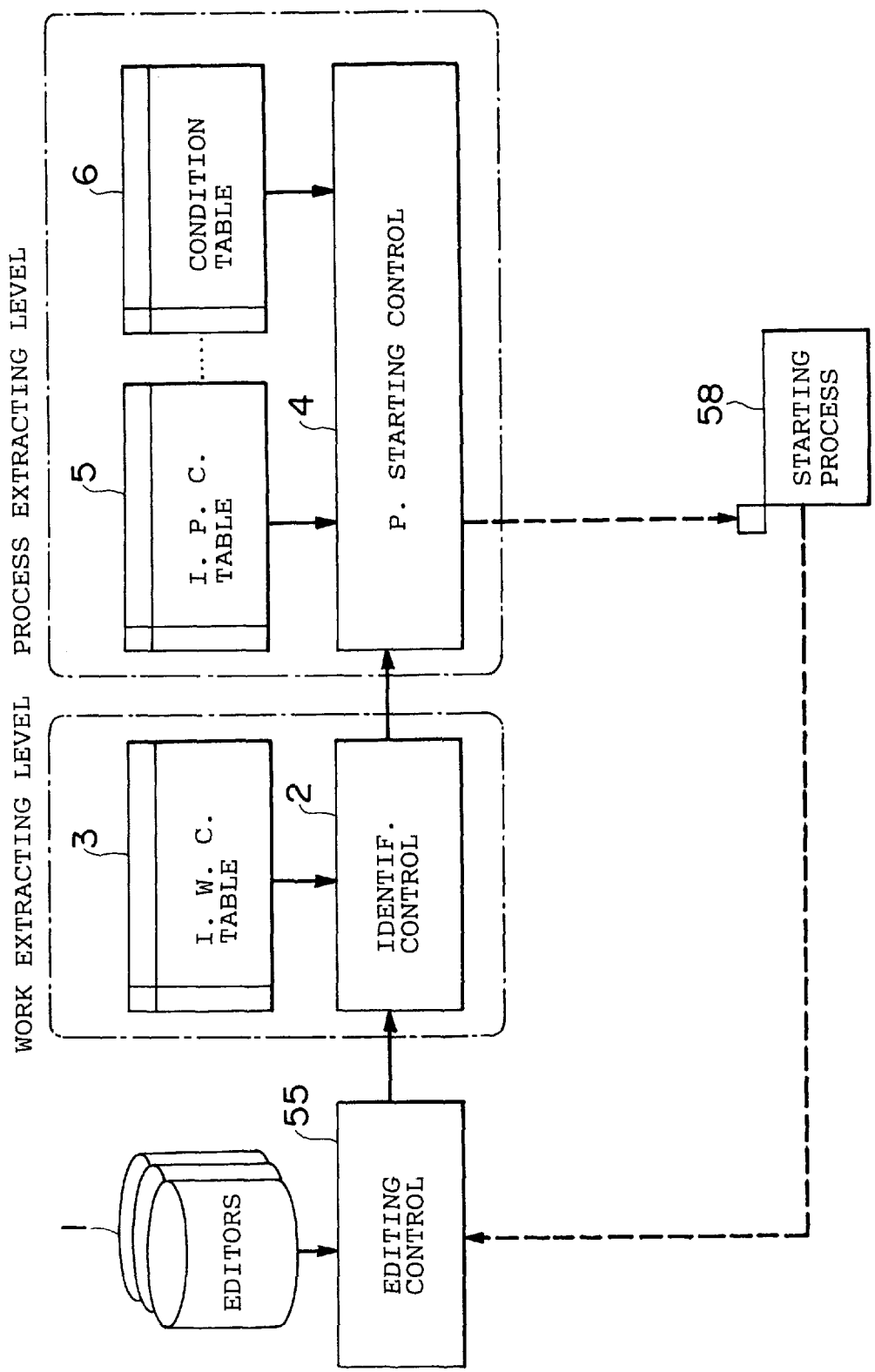
FIG. 8 is a block diagram of the system structure of Example 2 of the invention.

FIG. 8 shows the structure of the system of Example 2 of the present invention. Those blocks which are indicated by like reference numerals in FIGS. 2 and 8 have like functions and so those components which have been already described in connection with FIG. 2 will not be described in the present example. In FIG. 8, both user 51 and interactive managing-and-controlling portion 52 are omitted.

The present example is characterized in that it is equipped with an editor starting condition table 6 in which the starting forms for editors (e.g., display/update, pattern of names of storage files, and pattern of names of paths to stored locations) are contained as items. The table 6 may be included in the interlocking work starting process correlating table 5 or mounted in parallel with the correlating table 5.

In the present example, if a new process (the starting process 58) for assisting the work is a work for editing a document by an editor, then the process starting control portion 4 makes a collation with the interlocking work starting process correlating table 5. In addition, the process starting control portion 4 refers to the editor starting condition table 6 related to the table 5 and can establish the starting form, storage name, and the path to the storage location necessary to start the process (the starting process 58) for this editor.

Figure 10:
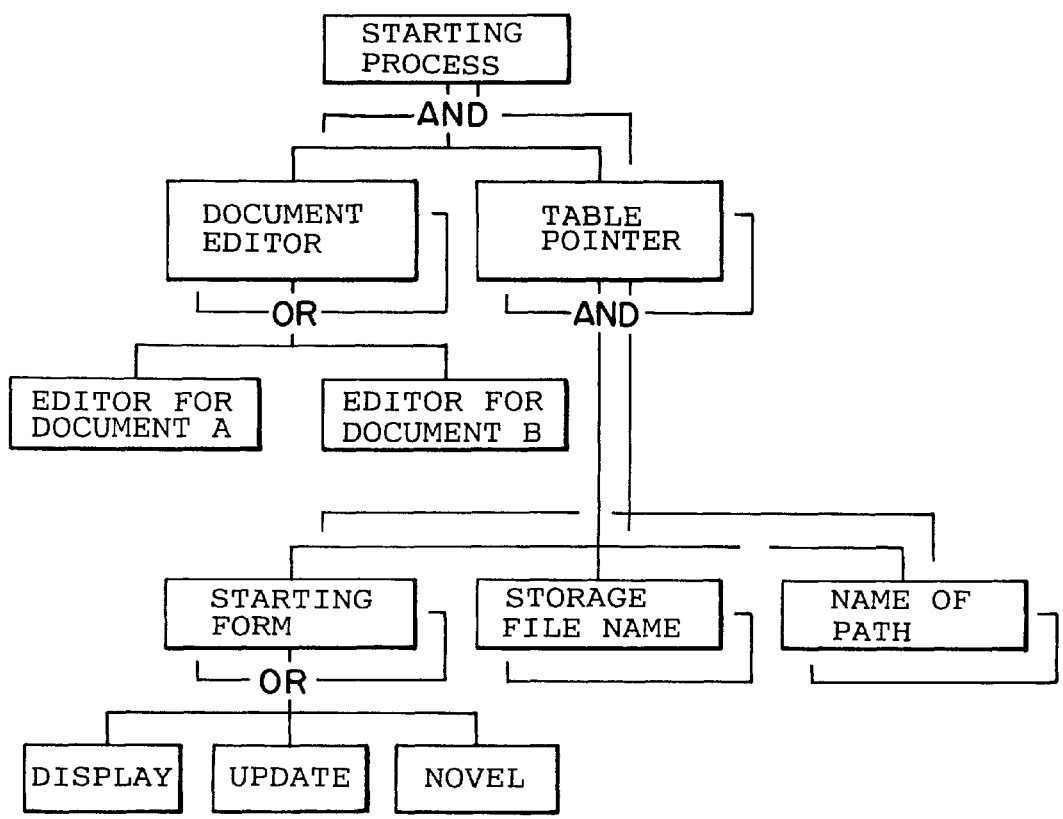
FIG. 10 is a block diagram showing the hierarchical structure of data assumed in an editor starting process in Example 2.

FIG. 10 hierarchically shows the data structure of the starting process. The hierarchical structure of the higher level than the starting process is shown in FIG. 7.

The starting process is composed of a "document editor" and an "editor starting condition table pointer". Any one of plural editors for editing documents is registered in the document editor. The editor starting condition table pointer has starting forms, storage file names, and names of paths to storage locations as attributes. In the starting forms, any one of the modes "display", "update", and "novel" is registered.

Figure 9:
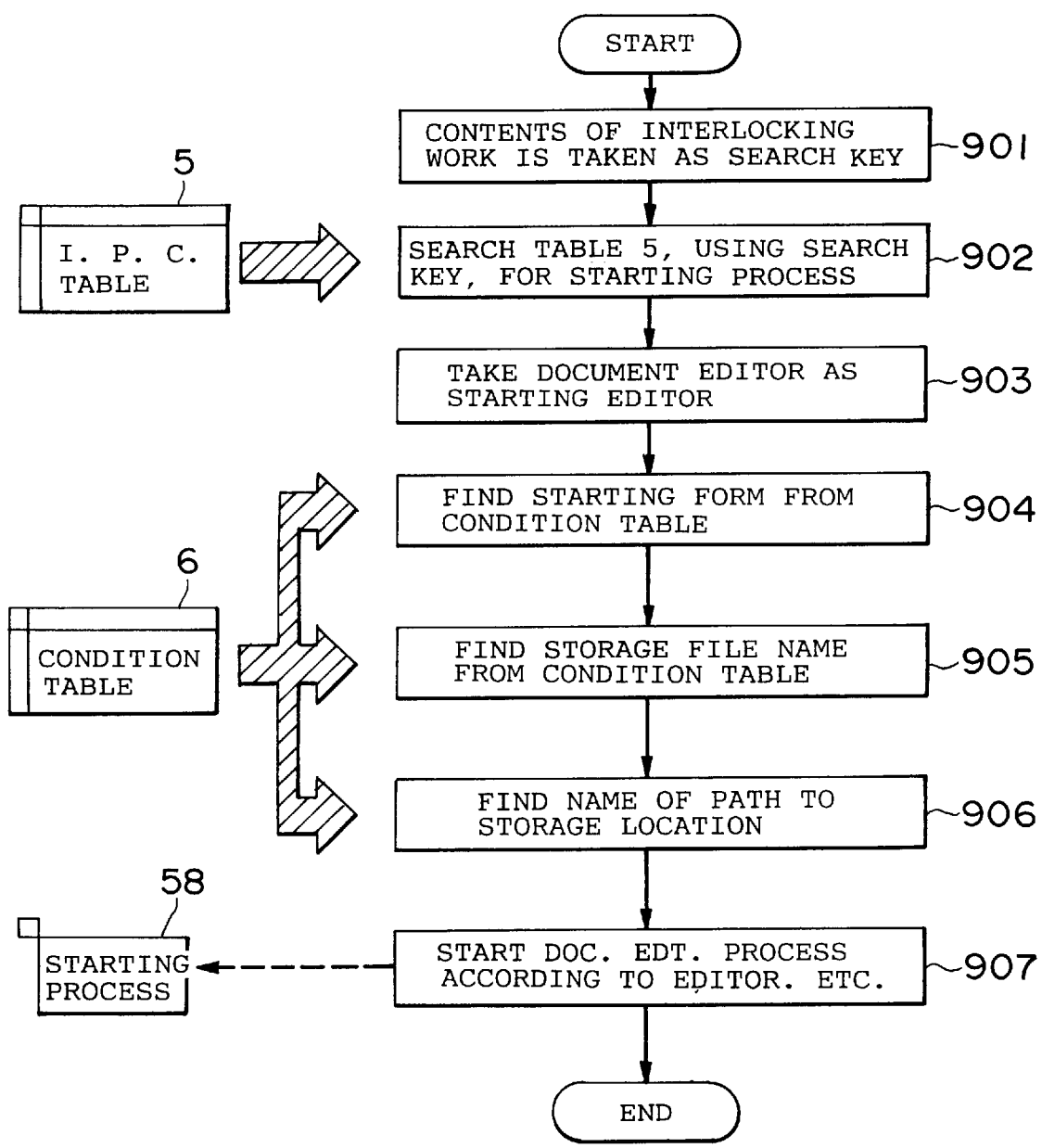
FIG. 9 is a flowchart illustrating the processing of Example 2 of the invention.

In the present example, the same processing as the processing of Example 1 is carried out until the contents of an interlocking work are transferred from the editing operation interlocking work identifying-and-controlling portion 2 to the process starting control portion 4. This process starting control portion 4 performs processing in the sequence illustrated in FIG. 9 according to the contents of the interlocking work.

Specifically, the process starting control portion 4 takes the contents of an interlocking work as a search key (step 901). The control portion 4 searches the interlocking work starting process correlating table 5, using the search key, according to the relation between the contents of the interlocking work and the starting process (FIG. 7), the relation being defined in the interlocking work starting process correlating table. In this way, the starting process is determined (step 902).

As already described in conjunction with in FIG. 10, the starting process is composed of a "document editor" and an "editor starting condition table pointer". The document editor determines for which of the documents should the document editor be started (step 903).

In the editor starting condition table pointer, combinations of starting forms (display, novel, and novel) for document editors, names of storage files, and names of paths to storage locations are defiled as the items of the editor starting condition table 6. The conditions under which a document editor to be started are determined according to the present table (steps 904, 905, and 906).

Finally, the document editor is started as the starting process 58 according to the kind of the document editor, the starting form (display, update, and novel), the file in which the result of the editing should be stored, and the storage locations.

EXAMPLE 3

Figure 11:
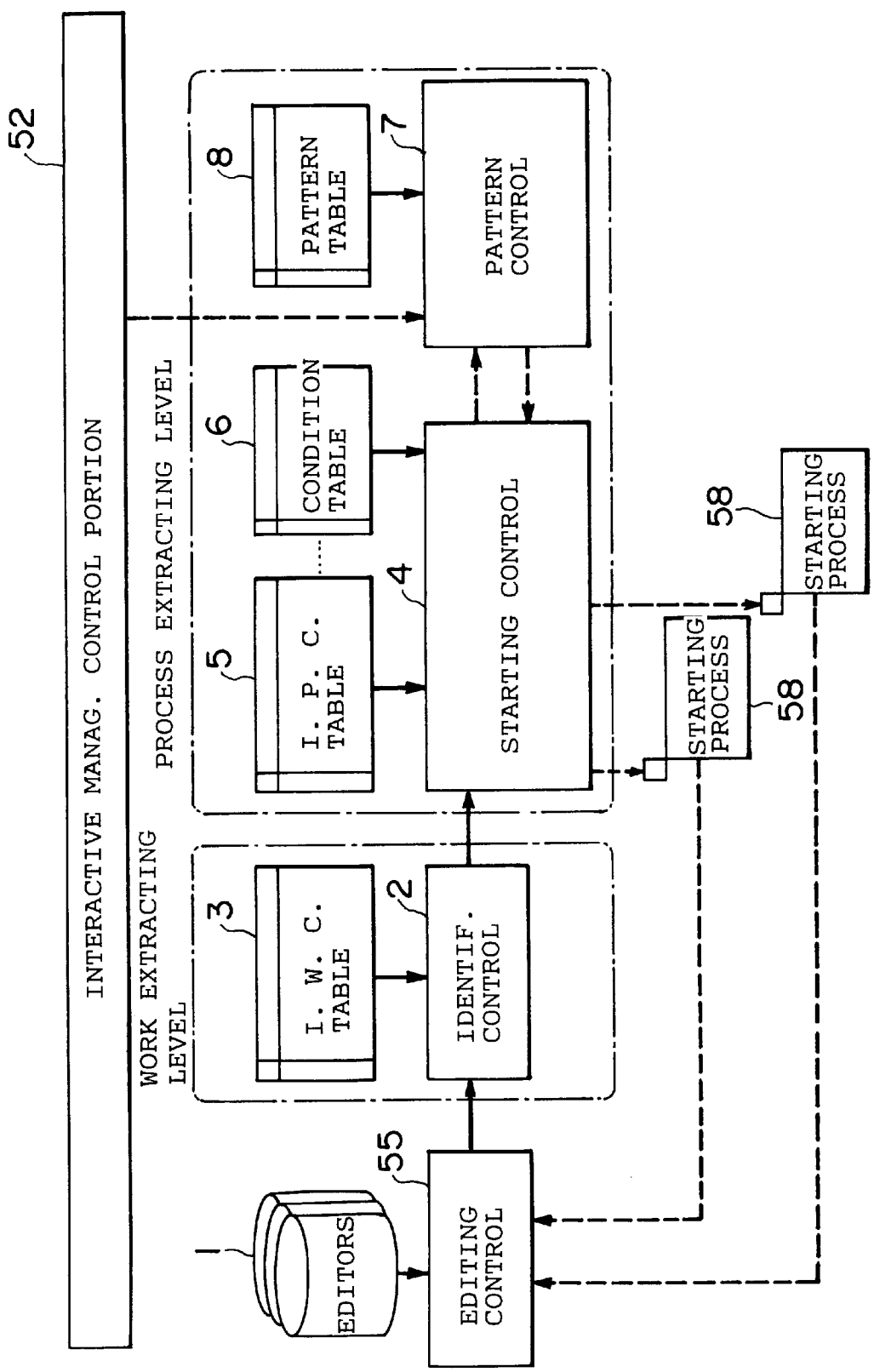
FIG. 11 is a block diagram of the system structure of Example 3 of the invention.

FIG. 11 shows the structure of the system of Example 3. Those blocks which have been already described in connection with FIGS. 2 and 8 will not be described here, since blocks denoted by like reference numerals indicate like functions. The user 51 and the interactive managing-and-controlling portion 52 are omitted in FIG. 11.

The present example is characterized in that it has the process starting pattern control portion 7 and the process starting pattern table 8.

In the present example, if plural assisting processes (starting process 58) exist for the corresponding work in the interlocking work starting process correlating table 5, the process starting control portion 4 calls the process starting pattern control portion 7 and starts the process according to the contents defined in the process starting pattern table 8. At this time, the pattern table 8 determines, for example, whether all the processes are started unconditionally or the processes are selectively started in response to interaction with the user 51.

Figure 14:
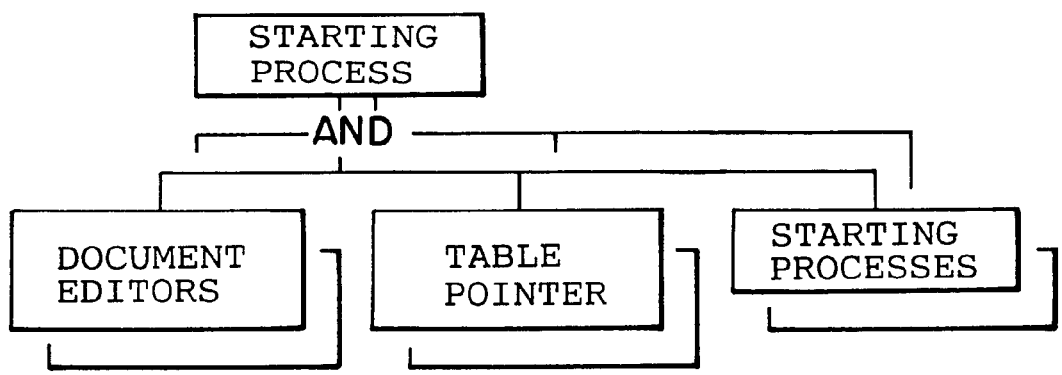
FIG. 14(a) is a block diagram showing the data structure of a starting process for starting plural editors in Example 3.
FIG. 14(b) is a block diagram showing the table structure of a process starting pattern table.
Figure 14B:
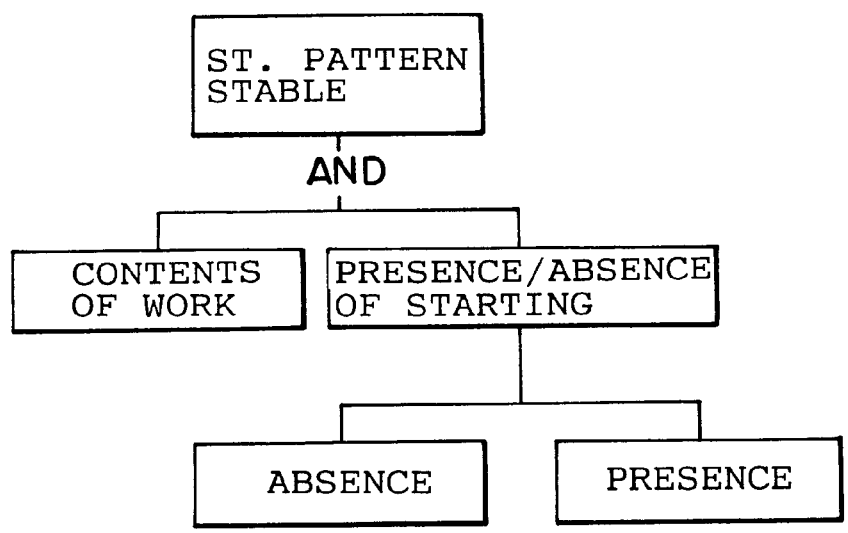

FIG. 14(*a*) shows the data structure of the starting process for starting plural editors. FIG. 14(*b*) shows the structure of the process starting pattern table 8.

In the starting process, the "document editors", the "editor starting condition table pointer", and the "starting process" are interrelated.

In the process starting pattern table, information about the contents of interlocking works and information indicating the presence or absence of selection of starting are defined in pairs. The information indicating the presence or absence of selection of starting indicates whether selection of starting is effected or not.

Figure 12:
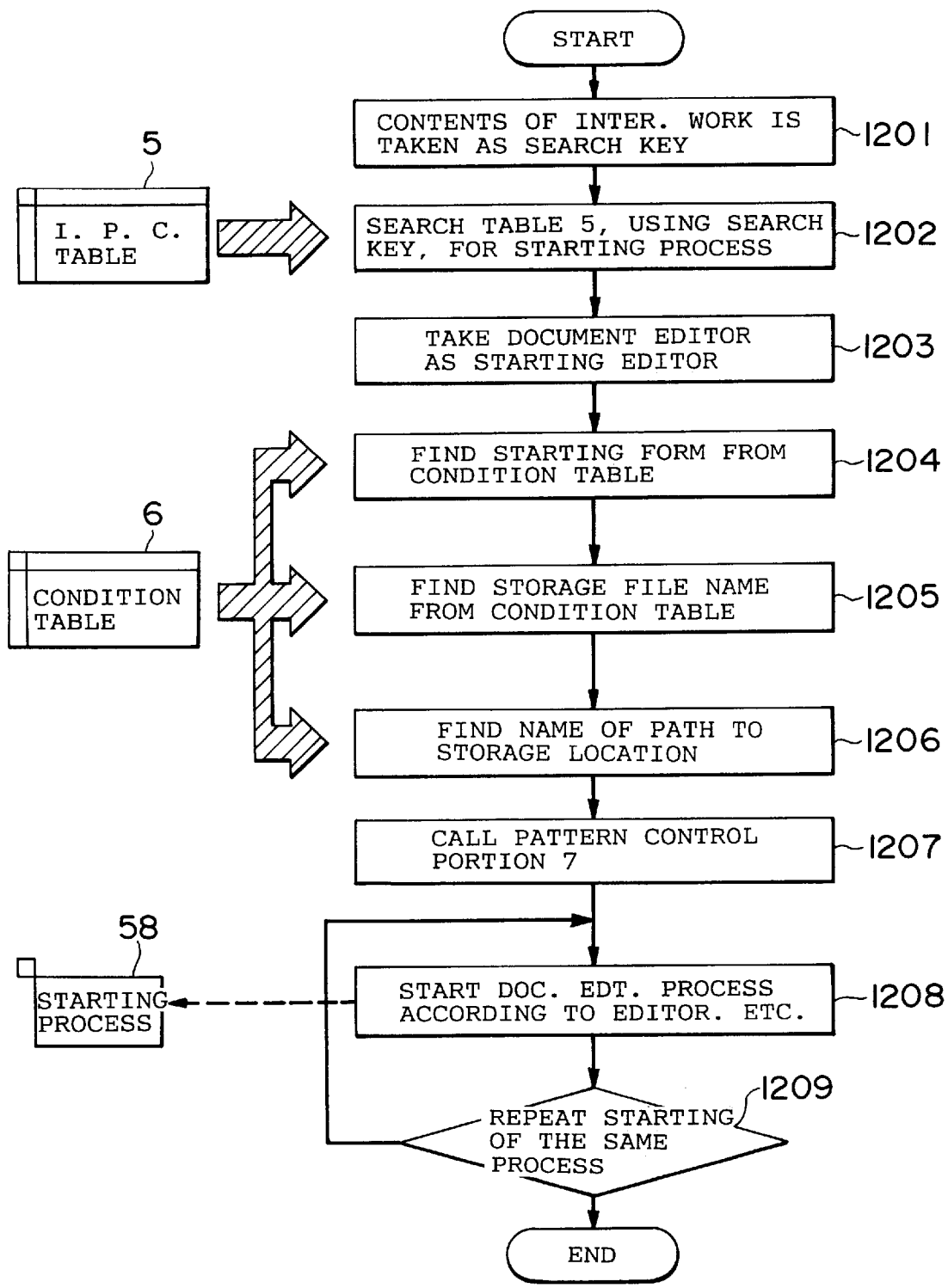
FIGS. 12 and 13 are flowcharts illustrating the processing of Example 3.

FIG. 12 illustrates the procedure for the processing of the present example. In the present example, the same processing as the processing of Example 1 is carried out until the contents of an interlocking work are transferred from the editing operation interlocking work identifying-and-controlling portion 2 to the process starting control portion 4.

First, the process starting control portion 4 takes the contents of an interlocking work as a search key (step 1201). The control portion 4 searches the interlocking work starting process correlating table 5, using the search key, according to the relation between the contents of the interlocking work and the starting process (FIG. 7), the relation being defined in the interlocking work starting process correlating table. In this way, the starting process is determined (step 1202).

As already described in Example 2 in conjunction with FIG. 10, the starting process is composed of a "document editor" and an "editor starting condition table pointer". The document editor determines for which of the documents should the document editors be started (step 1203).

In the editor starting condition table pointer, combinations of starting forms (display, novel, and novel) for document editors, names of storage files, and names of paths to storage locations are defined as the items of the editor starting condition table 6. The conditions under which a document editor to be started are determined according to the present table (steps 1204, 1205, and 1206).

Then, the process starting control portion 4 calls the process starting pattern control portion 7 (step 1207).

Figure 13:
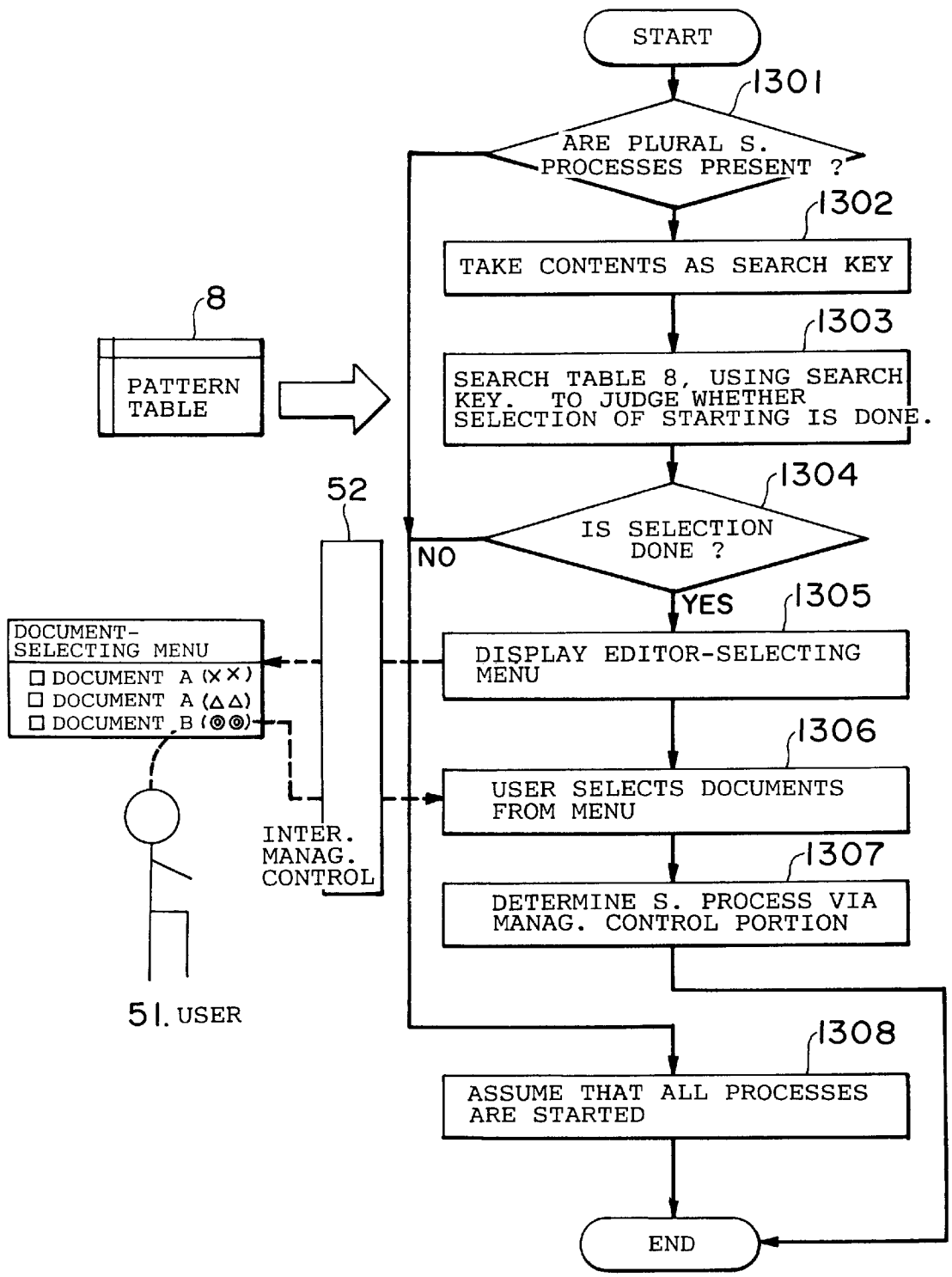

FIG. 13 illustrates the processing of the process starting pattern control portion 7.

The process starting pattern control portion 7 searches the process starting pattern table 8 according to the contents of an interlocking work, and makes a decision as to whether plural starting processes should be started unconditionally or some starting processes are started according to the result of a selection made by the user 51 (steps 1301–1303). If all the processes are started unconditionally (step 1304), then the control portion informs the process starting control portion 4 that all the processes are started (step 1308).

If the control portion 7 causes the user 51 to check a selection of a starting process (step 1304), an image permitting selection of the document to be edited is displayed on the display screen via the screen image display control portion 57 and also via the interactive managing-and-controlling portion 52. Thus, the user 51 is urged to make a selection (steps 1305–1306).

The user 51 selects one or more documents to be edited from the selection menu image displayed (step 1306). A process to be started is determined via the interactive managing-and-controlling portion 52 (step 1307).

After the starting process is determined in this way, control is again transferred to the process starting control portion 4. In this manner, the above-described step 1208 illustrated in FIG. 12 is resumed.

In step 1208, an editor is started as the starting process 58 according to the kind of document editor, starting form (display, update, or novel), file in which the result of the editing should be stored, and the storage locations all of which are found in steps 1204–1206 (step 1208).

If plural processes, or plural document editors, are started, starting of the same process is repeated as many as the number of the editors. Then, the processing is ended (step 1209).

EXAMPLE 4

Figure 15:
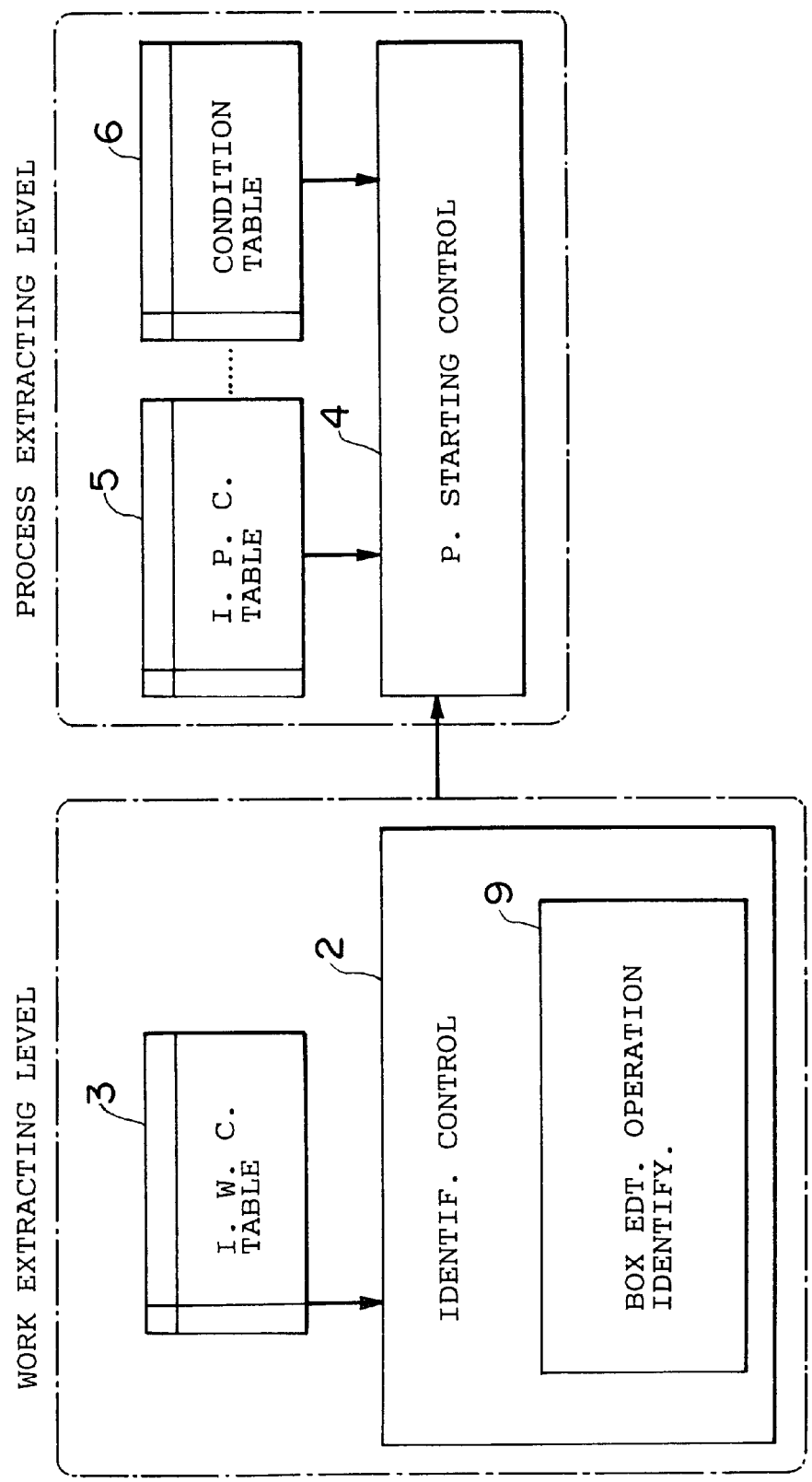
FIG. 15 is a block diagram showing the system structure of Example 4 of the invention.

FIG. 15 shows the system structure of Example 4. Those blocks which have been already described in connection with FIGS. 2 and 8 will not be described here, since blocks denoted by like reference numerals indicate like functions. The user 51, the interactive managing-and-controlling portion 52, the document editors 1, the document editing control portion 55, and the starting process 58 are omitted in FIG. 15.

Figure 18:
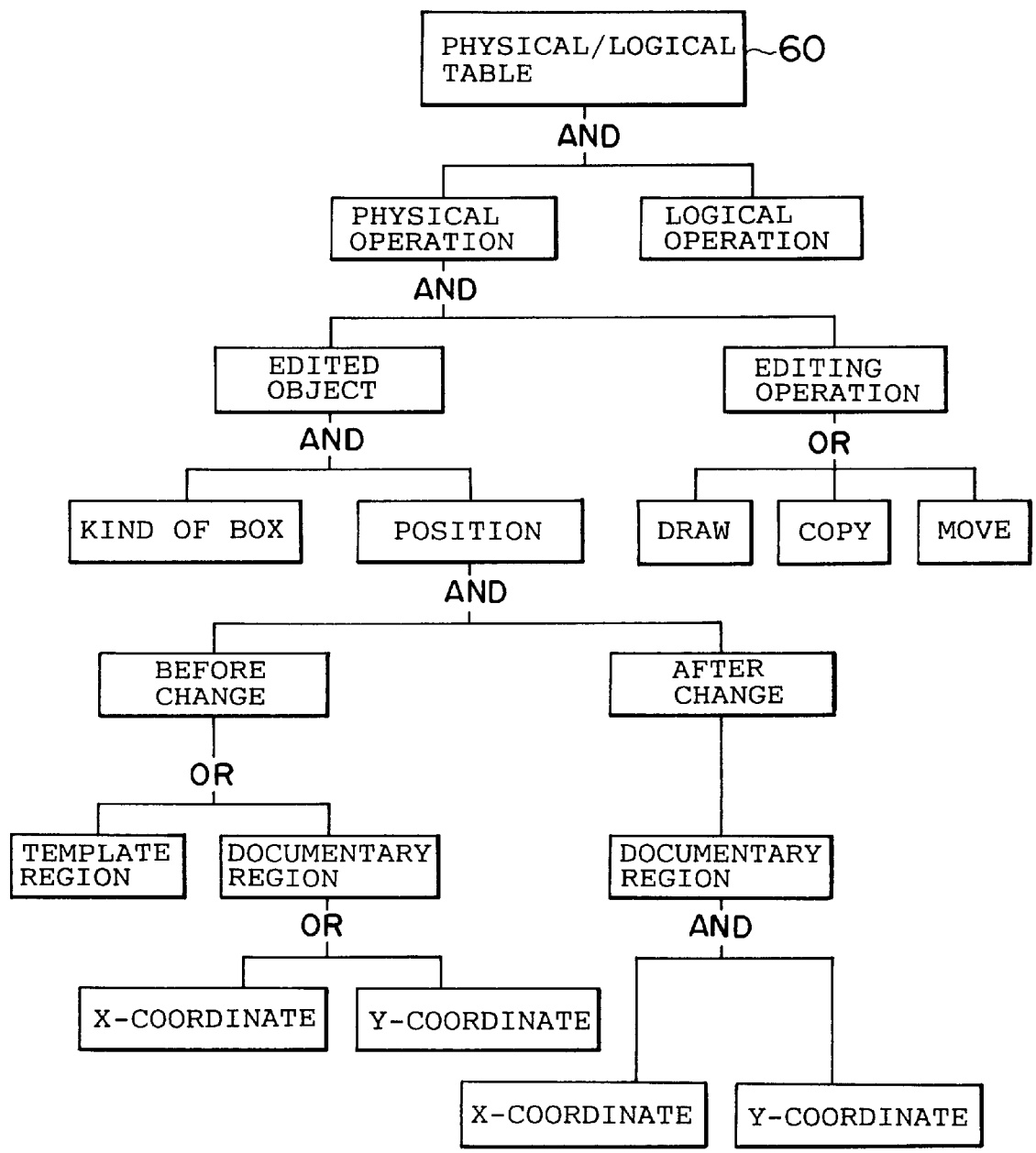
FIG. 18 is a block diagram showing the structure of a graphic box physical/logical operation correlating table used in Example 4.

Example 4 is characterized in that the editing operation interlocking work identifying-and-controlling portion 2 has a graphic box editing operation identifying portion 9 containing a physical/logical operation correlating table 60 (FIG. 18).

Specifically, only information about editing operations on graphic boxes are discriminated from the editing operation information entered into the editing operation interlocking work identifying-and-controlling portion 2. The discriminated information is collated with the editing operation interlocking work correlating table 3 to identify a necessary assisting work. The process starting control portion 4 receives information about the assisting work from the editing operation interlocking work identifying-and-controlling portion 2, collates the received information with the interlocking work starting process correlating table 5 and also with the editor starting condition table 6. In this way, an editor for editing another document associated with operations on the corresponding graphic box is started.

Figure 17:
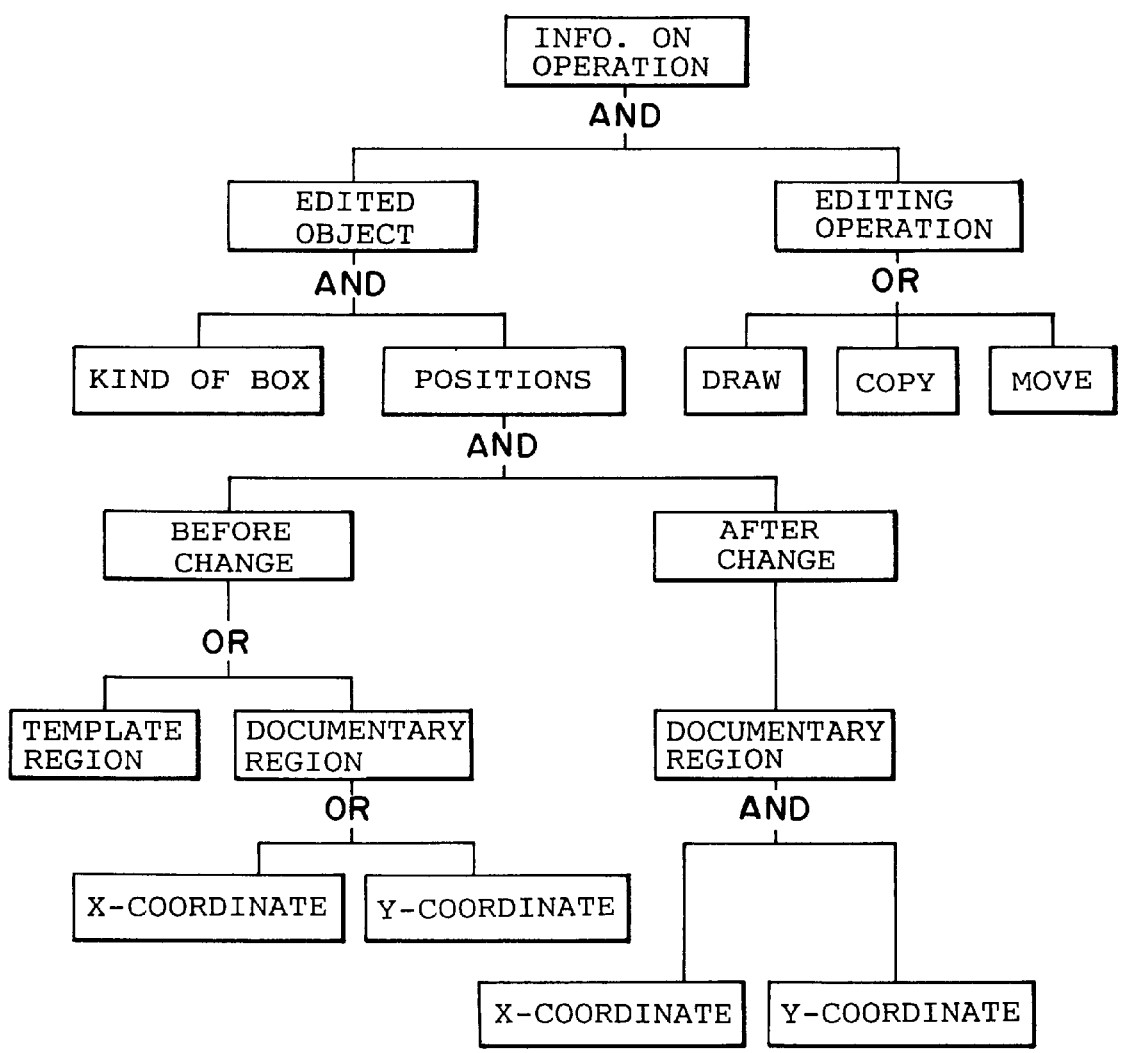
FIG. 17 is a block diagram showing the data structure of information about graphic box editing operations assumed in Example 4.

FIG. 17 shows the data structure of the information about the editing operations on the graphic box in the present example.

The "information about editing operations" is composed of an "object to be edited" and "editing operations". The "object to be edited" contains "kind of graphic box" and "positions" as information. The "positions" include information about a position assumed before a modification and information about a position assumed after the modification. In the case of the information about a position assumed before a modification, either a "template" region or a "documentary" region is defined. In the documentary region, either an X-coordinate or a Y-coordinate is defined.

On the other hand, in the information about a position assumed after the modification, a "documentary" region is defined. Furthermore, X- and Y-coordinates are defined.

"Editing operations" are located at a lower level of hierarchy than the "information about editing operations". Any one of "draw", "copy", and "move" is defined at a lower level than the "editing operations".

FIG. 18 shows the structure of the physical/logical operation correlating table 60 belonging to the graphic box editing operation identifying portion 9. In particular, the table 60 is composed of "physical operations" and "logical operations". The "physical operations" mean the XY coordinates of a graphic box which is modified by the user 51 who operates the keyboard 35 or the mouse 36. The "logical operations" mean operations for discriminating interpretations of operations from each other by interpreting the meanings of graphics on documents and of fields when graphic boxes are physically changed. For example, where a document descriptive region on a document is divided into a region linked to other documents and a region not linked to any other document, if an operation is performed to draw the same graphic box, then the region on which the drawing is made is interpreted as being linked or not being linked to editors.

The structure located at the lower level than the "physical operations" is the same as the data structure of the information about graphic box editing operation illustrated in FIG. 17.

Figure 16:
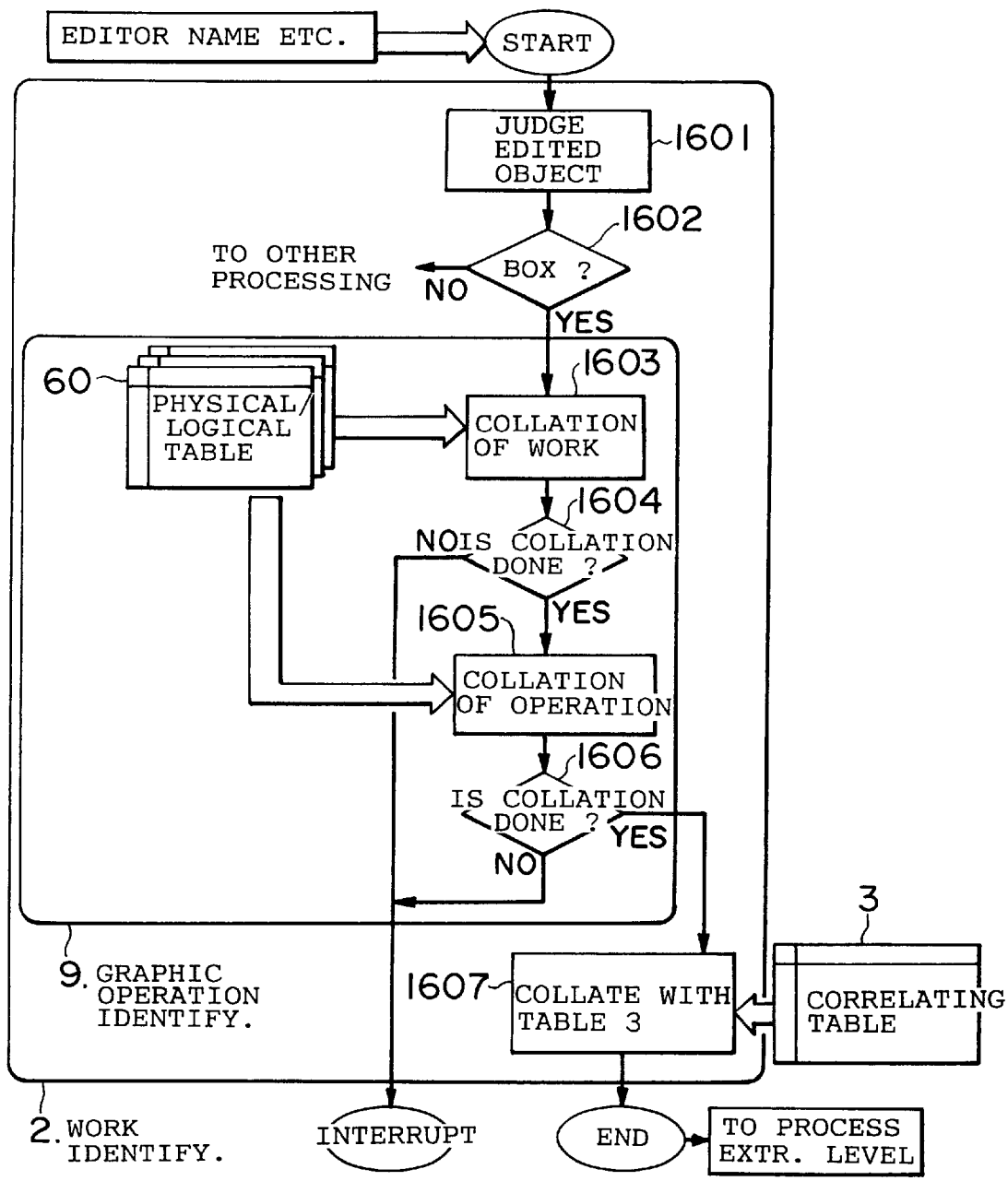
FIG. 16 is a flowchart illustrating the processing of Example 4.

FIG. 16 illustrates the processing of the present example.

If the document editing control portion 55 informs the editing operation interlocking work identifying-and-controlling portion 2 of an editor name, the name of an object to be edited, and a region name, then the controlling portion 2 judges the object to be edited (step 1601).

If the object is a graphic box (step 1602), the graphic box editing operation identifying portion 9 is started, the physical/logical operation correlating table 60 is read (step 1603), and the interlocking work is collated. If collation of the interlocking work is carried out (step 1604), the table 60 is read, and operations are collated (step 1605). If the collation is done, after collation with the editing operation interlocking work correlating table 3 is carried out (step 1607), control goes to the process starting control portion 4.

EXAMPLE 5

Figure 19:
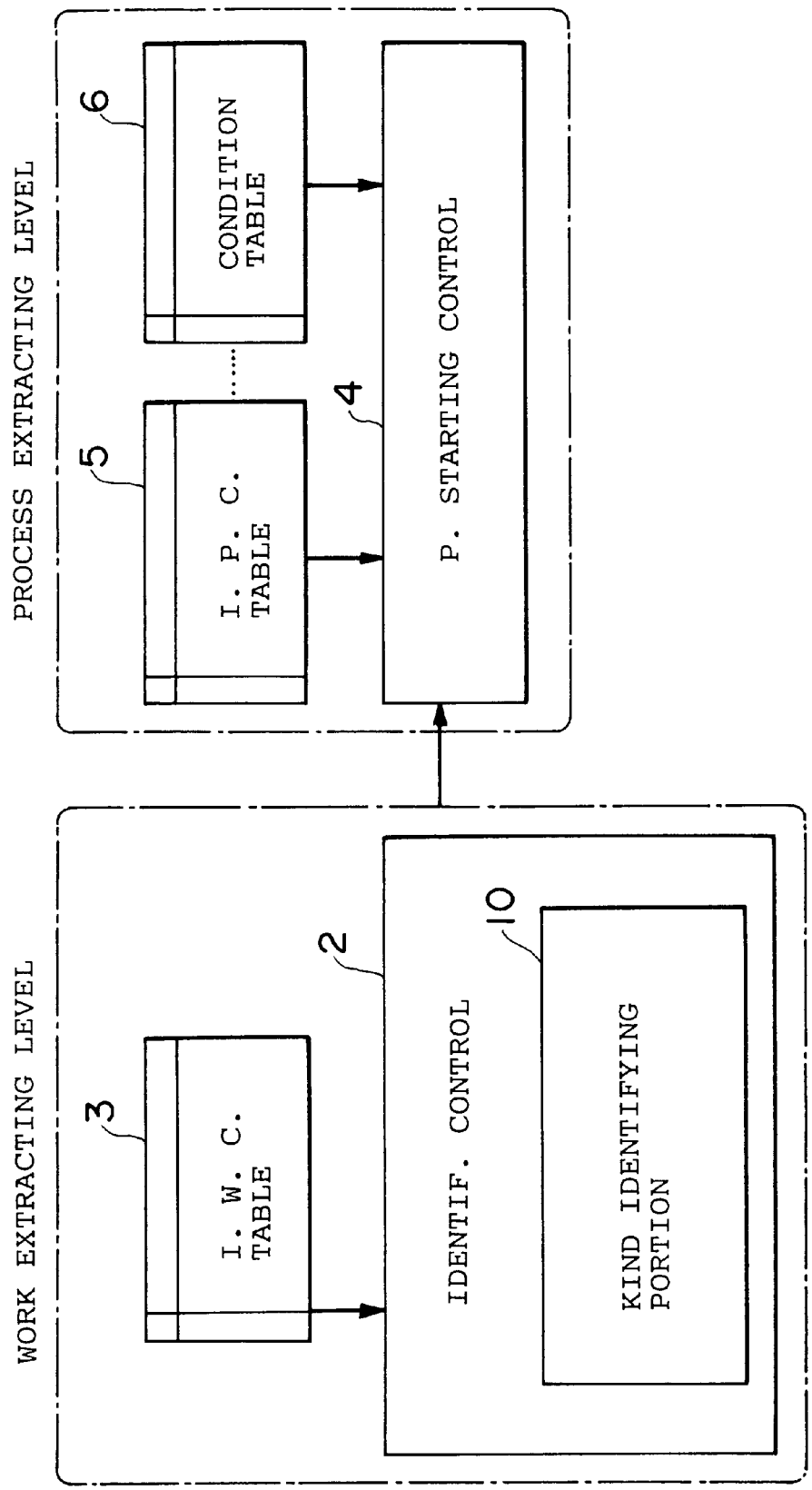
FIG. 19 is a block diagram showing the system structure of Example 5 of the invention.

FIG. 19 shows the structure of the system of Example 5. Blocks denoted by like reference numerals indicate like functions and so those blocks which have been already described in connection with FIG. 15 will not be described below.

The present example is characterized in that the editing operation interlocking work identifying-and-controlling portion 2 has the character array kind identifying portion 10, which discriminates only information about editing operations on a character array region from editing operation information entered into the editing operation interlocking work identifying-and-controlling portion 2, collates the discriminated information with the editing operation interlocking work correlating table 3, and selects a required assisting work. Then, the identifying-and-controlling portion 2 transfers the information regarding the assisting work to the process starting control portion 4. The control portion 4 collates the transferred information with the interlocking work starting process correlating table 5 and also with the editor starting condition table 6. In this way, an editor for editing another document associated with operations on the corresponding character array region is started.

Figure 20:
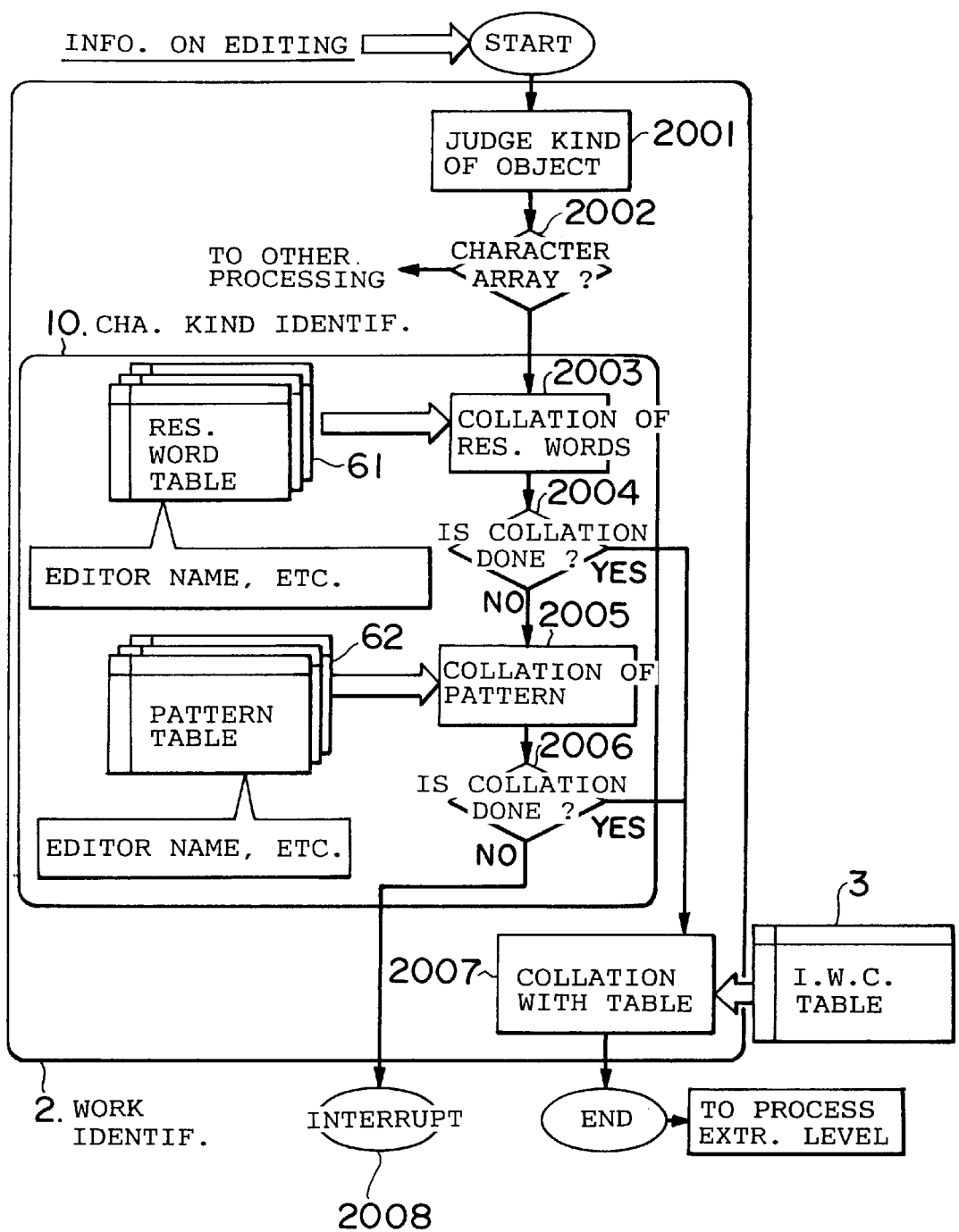
FIG. 20 is a flowchart illustrating the processing of Example 5.

FIG. 20 illustrates the procedure for this processing.

In the editing operation interlocking work identifying-and-controlling portion 2, when editing information is transferred, if and only if processing for judging the kind of the object to be operated indicates that it is a character array region, the character array kind identifying portion 10 is started (steps 2001 and 2002). In the present example, the character array kind identifying portion 10 is equipped with a character editing region-classified reserved word table 61 and a character editing region-classified character pattern table 62. Reserved words and character patterns which can be entered into the character array, region are defined in these word table 61 and pattern table 62, respectively. If and only if reserved words and character patterns are collated, collation with the editing operation interlocking work correlating table 3 by the editing operation interlocking work identifying-and-controlling portion 2 is done, using information about editor's editing (steps 2003–2006). If the contents of the input to the character region of the object to be operated is matched neither to the reserved words nor to character patterns, then the process is interrupted (step 2008). In this way, editors for the associated documents are prevented from being started. These reserved words or character patterns may be fixed for each individual editor. That is, they are fixed within an editor program as a ROM table in a memory. Alternatively, they may take the form of RAM tables which can be modified by their respective users.

EXAMPLE 6

Figure 21:
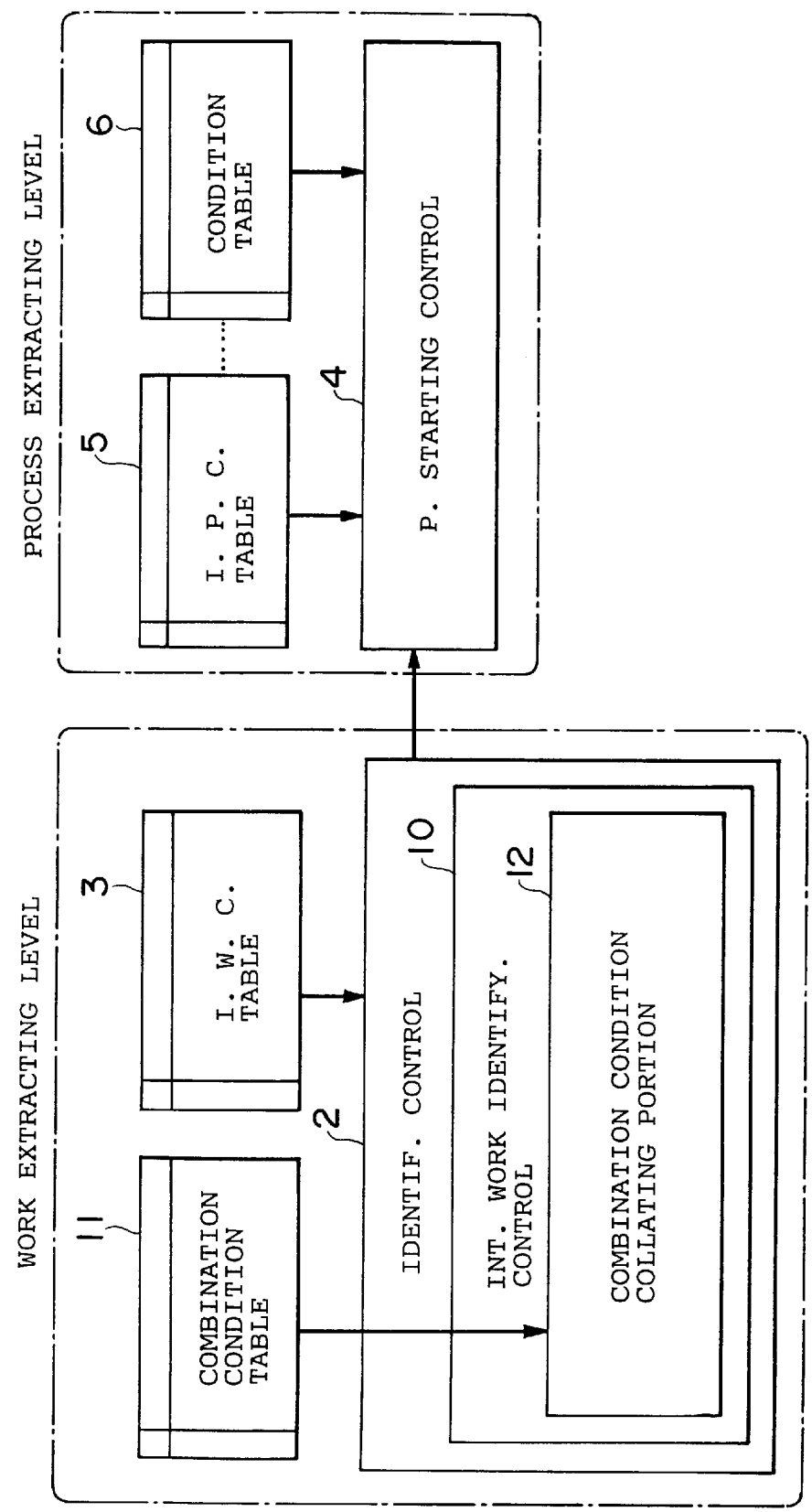
FIG. 21 is a block diagram showing the system structure of Example 6.

FIG. 21 shows the structure of the system of Example 6. Blocks denoted by like reference numerals indicate like functions and so those blocks which have been already described in connection with FIG. 19 will not be described below.

The present example is characterized in that the character array kind identifying portion 10 inside the editing operation interlocking Work identifying-and-controlling portion 2 has the character array kind combination condition collating portion 12.

In the present example, when operation information about a character array is received by the character array kind identifying portion 10, the character array kind combination condition collating portion 12 collates already entered data in the same character array region and the presently entered data about the character array region with the character array kind combination condition table 11. If and only if the combination conditions are satisfied, collation with the editing operation interlocking work correlating table 3 is started. In the present example, a related work and consequent starting of an editor can be controlled with higher accuracy according to a character array pattern variation caused by an editing operation than in Example 5 in which an editor is started in step with entry of a character array.

Figure 23:
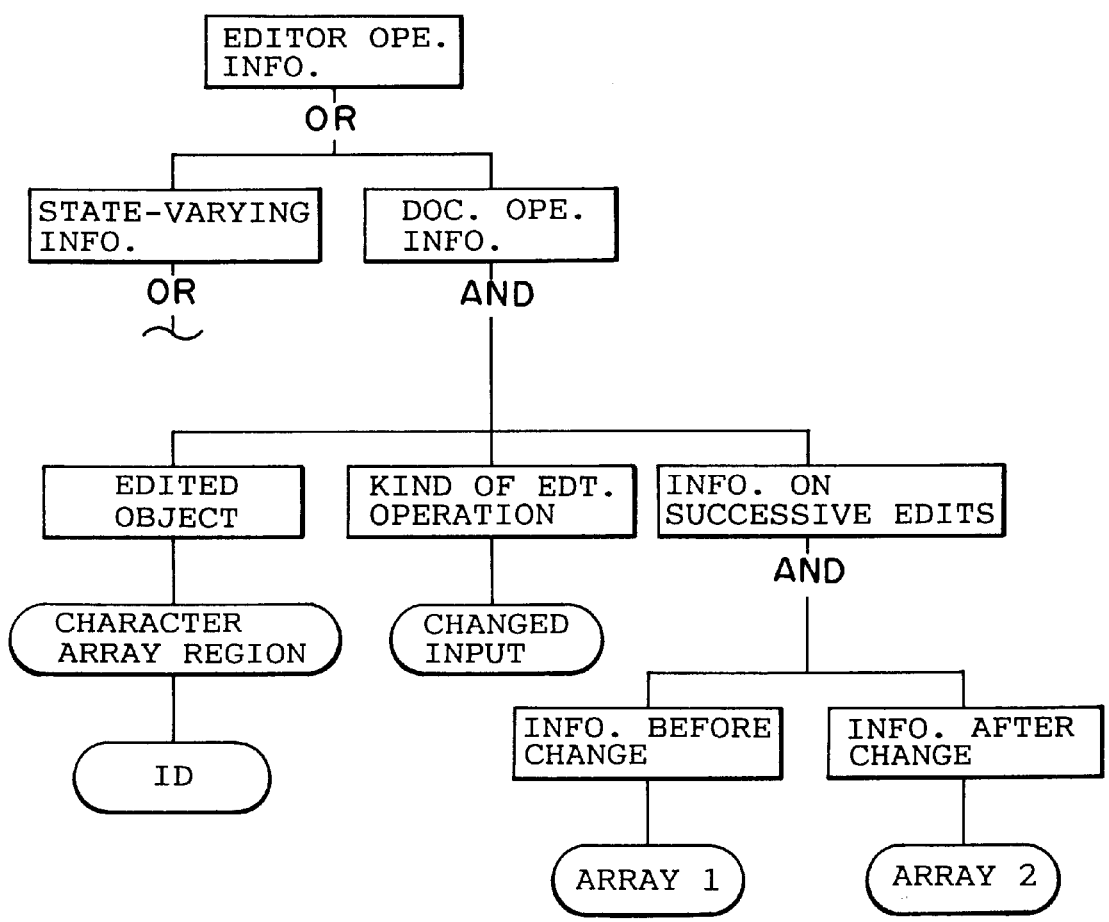
FIG. 23 is a block diagram showing the hierarchical data structure of data about editor operations performed in Example 6.

FIG. 23 illustrates an example of information about an editor operation, the information being received by the character array kind combination condition collating portion 12 from the character array kind identifying portion 10 described in Example 5. A character array region is entered as an object to be edited. Also, an identifying number or identifier (ID) for the character array region is entered. Furthermore, a character array 1 produced before a modification and a character array 2 produced after the modification are input as entities.

Figure 22:
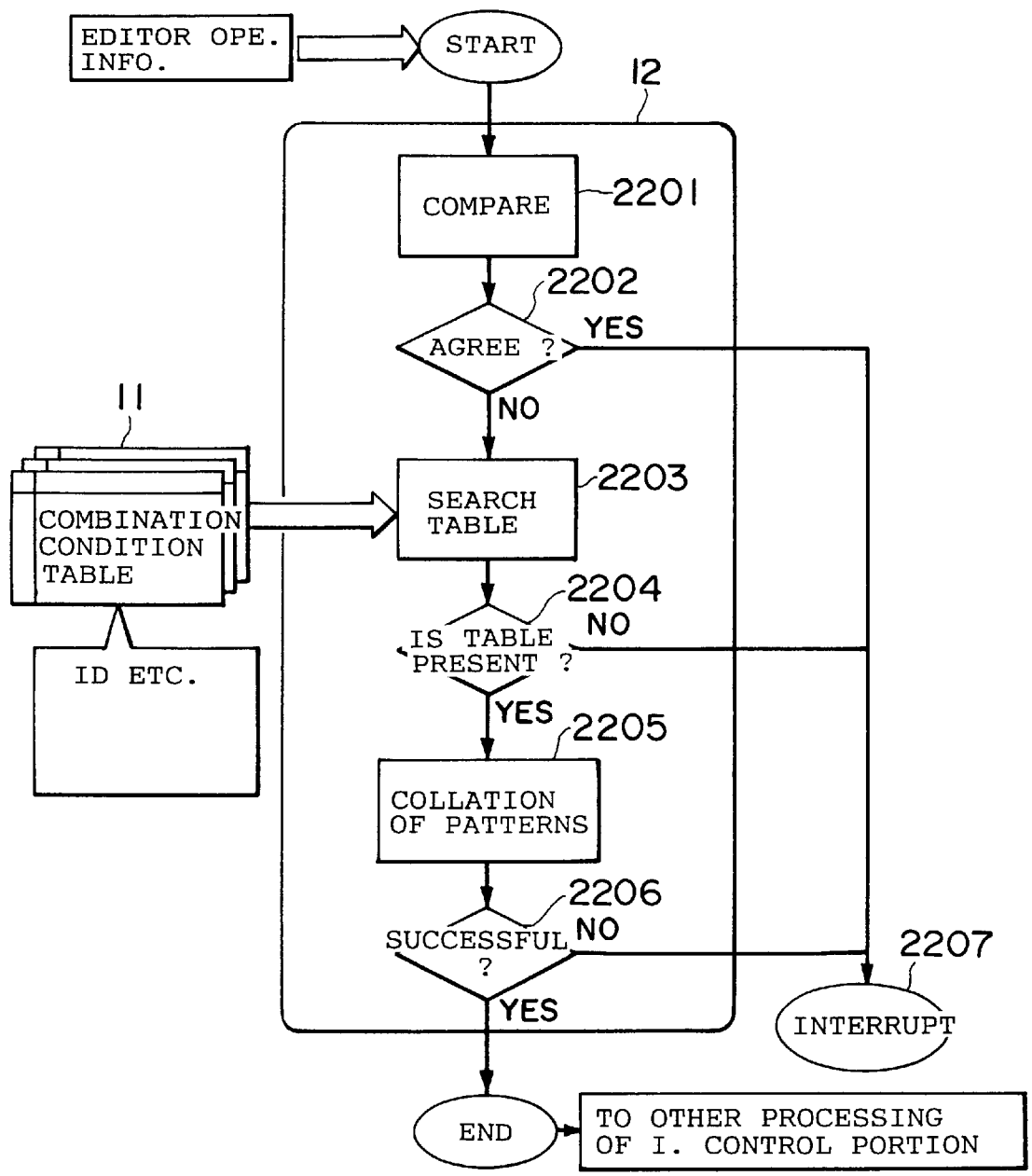
FIG. 22 is a flowchart illustrating the processing of Example 6.

In FIG. 22, the character array kind combination condition collating portion 12 receives editor operation information from the editing operation interlocking work identifying-and-controlling portion 2. The character array produced after the modification is compared with the character array produced before the modification (steps 2201 and 2202). If they are different, the character array kind combination condition table 11 is searched, using the identifying number (ID) for the character array (step 2203). If the result of the search is detected, the character array pattern used before the modification is collated with the character array pattern used after the modification (steps 2204 and 2205). If the collation of both patterns is successful (step 2206), then normal state is regained. The next processing of the editing operation interlocking work identifying-and-controlling portion 2 is performed. Subsequently, a related editor process is started.

If the results of the decisions made in the processing steps described above agree with none of the foregoing situations, then the interrupted information 2207 is restored. The subsequent starting of the related editor process is not carried out.

The character array kind combination condition table 11 may be a fixed different ROM table in a memory for each individual identifying number or may be a different RAM table for each individual user. The contents of the RAM tables may be modified by their respective users.

EXAMPLE 7

Figure 24:
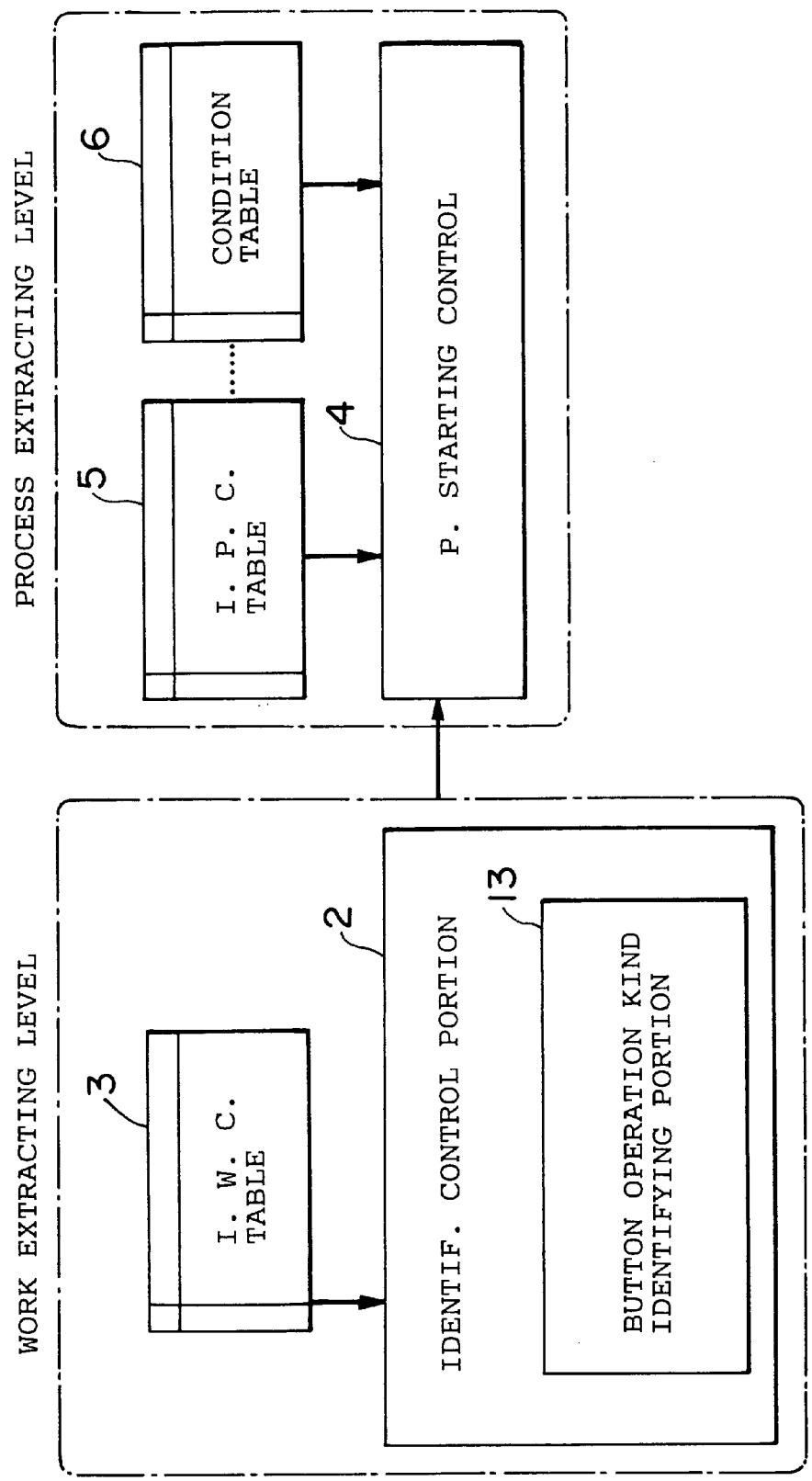
FIG. 24 is a block diagram showing the system structure of Example 7 of the invention.
Figure 27:
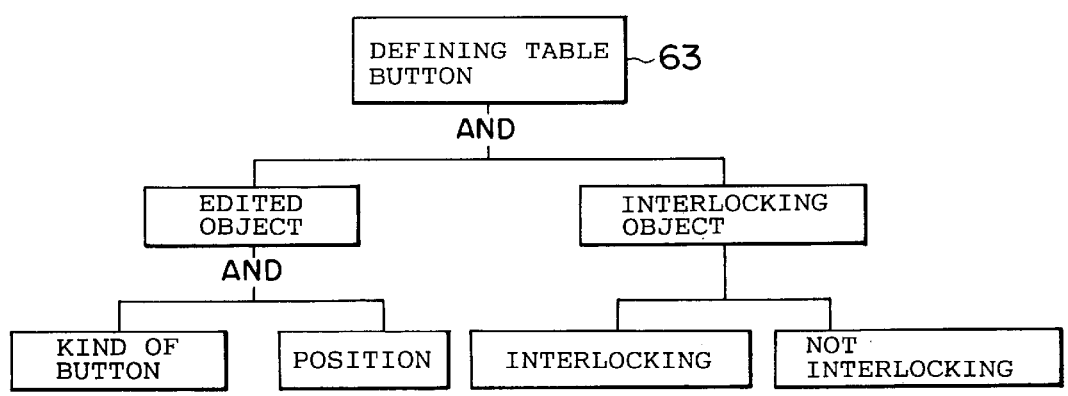
FIG. 27 is a block diagram showing the data structure of information about graphic button editing operations assumed in Example 7.
Figure 28:
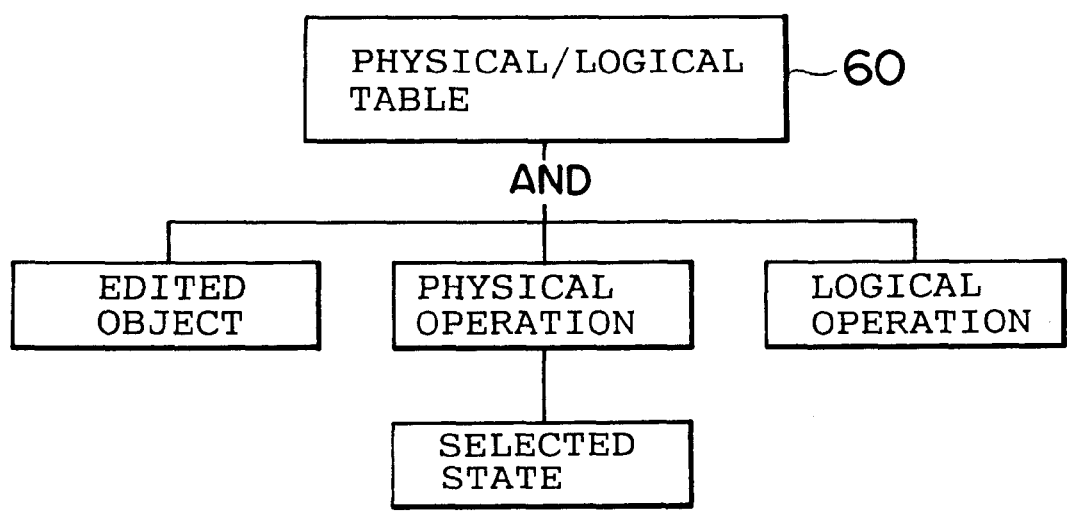
FIG. 28 is a block diagram of the hierarchical structure of a graphic button physical/logical operation correlating table used in Example 7.

FIG. 24 shows the structure of the system of Example 7. The present example is characterized in that the graphic button operation identifying portion 13 is included in the editing operation interlocking work identifying-and-controlling portion 2. The identifying portion 13 extracts only editing operation information about a graphic button from the editing operation information entered into the editing operation interlocking work identifying-and-controlling portion 2 and collates the extracted information with the editing operation interlocking work correlating table 3 to identify the requisite assisting work. The identifying portion 13 has an interlocking object graphic button defining table 63 and a physical/logical operation correlating table 60. These tables are organized as shown in FIGS. 27 and 28, respectively.

Figure 26:
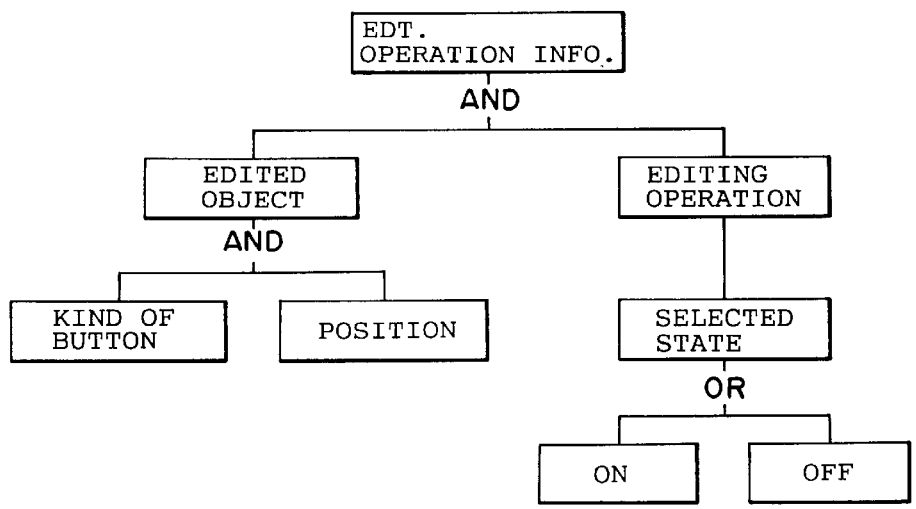
FIG. 26 is a block diagram showing the data structure of information about graphic button editing operations assumed in Example 7.

FIG. 26 shows the data structure of information about graphic button editing operations. The "information about graphic button editing operations" is composed of an "object to be edited" and "editing operations". The "information about graphic button editing operations" includes information about "kinds of graphic buttons" and information about their "positions". The "object to be edited" includes information about a selected state, or an ON or OFF state.

Figure 25:
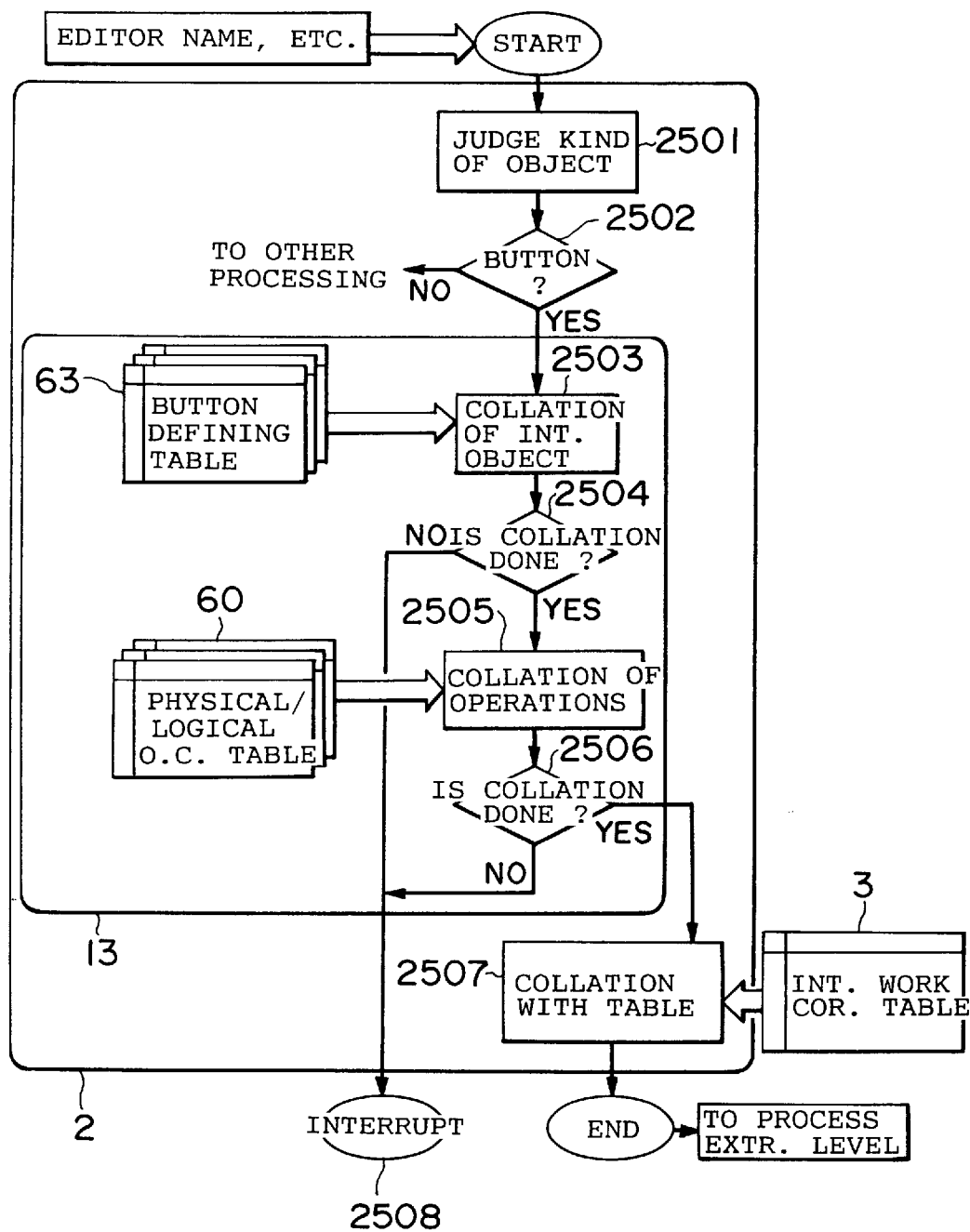
FIG. 25 is a flowchart illustrating the processing of Example 7.

FIG. 25 illustrates the procedure for processing for judging that the edited object is a graphic button, based on information about editing operations, and for judging an interlocking operation.

When information about editing is transferred, the editing operation interlocking work identifying-and-controlling portion 2 performs processing 2501 for judging the kind of an object to be operated to start the graphic button operation identifying portion 13 (step 2502) if and only if the object relates to a graphic button. In the present example, the graphic button operation identifying portion 13 is equipped with the aforementioned interlocking object graphic button defining table 63 and also with the physical/logical operation correlating table 60. Processing 2503 for collating an interlocking object is performed. A decision is made as to whether a collation is made or not (step 2504). If the collation is made successfully, control goes to step 2505, where processing for collating an editing operation is performed. Then, control goes to step 2506, where a decision is made as to whether a collation has been made. If the collation has been made, control goes to step 2507, where a collation with the editing operation interlocking work correlating table 3 is made under the control of the editing operation interlocking work identifying-and-controlling portion 2. If it is necessary to perform an interlocking operation for an editing operation on the graphic button to be edited, the contents of the edited graphic button are judged, using both interlocking object graphic button defining table 63 and physical/logical operation correlating table 60. The editing operation interlocking work identifying-and-controlling portion 2 determines an interlocking work to be performed.

The process starting control portion 4 receiving the information about an assisting work from the editing operation interlocking work identifying-and-controlling portion 2 in this way and collates the information with the interlocking work starting process correlating table 5 and also with the editor starting condition table 6. Then, the identifying-and-controlling portion 2 starts an editor for editing another document associated with operations on the graphic button.

EXAMPLE 8

Figure 29:
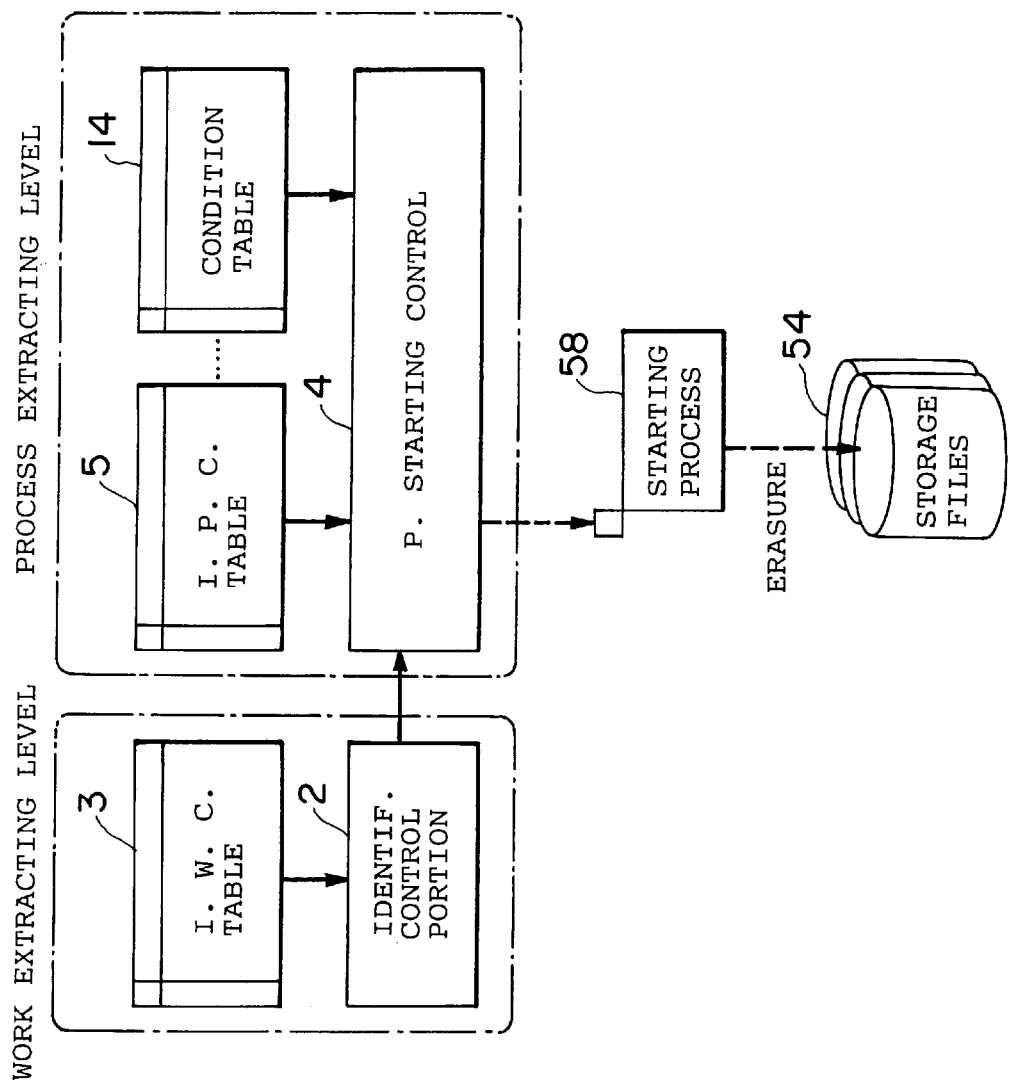
FIG. 29 is a block diagram showing the system structure of Example 8 of the invention.

FIG. 29 shows the structure of the system of Example 8. Example 8 is characterized in that the process starting control portion 4 has the associated document erasure condition table 14. In the present example, if the result of the collation with the interlocking work starting process correlating table 5 under the control of the process starting control portion 4 is a process related to erasure of an associated document, then erasure conditions associated with this erasure process are extracted from the associated document erasure condition table 14. Based on the extracted conditions, parameters for the erasure process such as a path to the storage location in which editing information files are stored and file names can be established. The editing information storage files 54 for the associated document can be deleted in step with an erasure operation on a given document.

Figure 30:
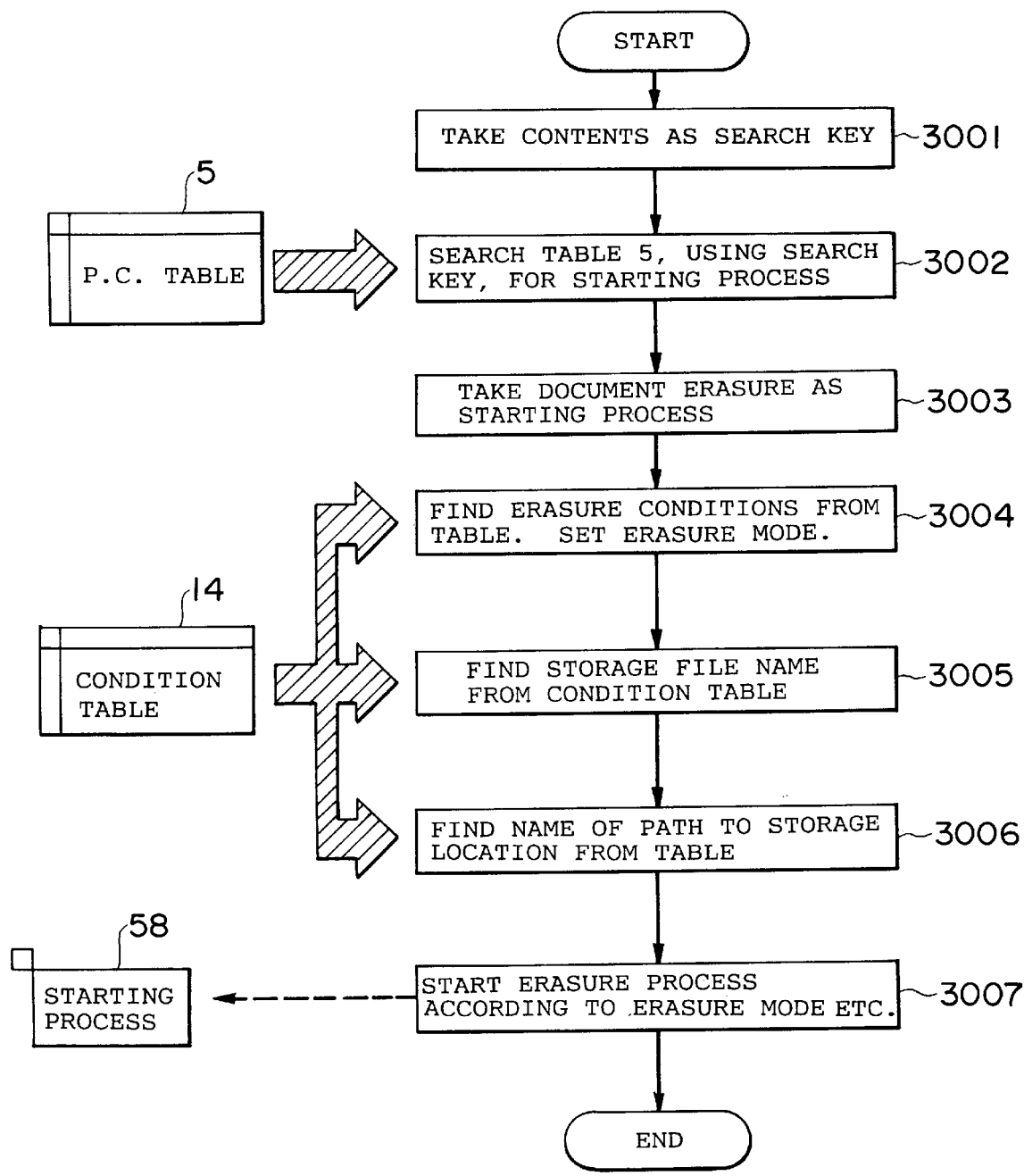
FIG. 30 is a flowchart illustrating the processing of Example 8.
Figure 31:
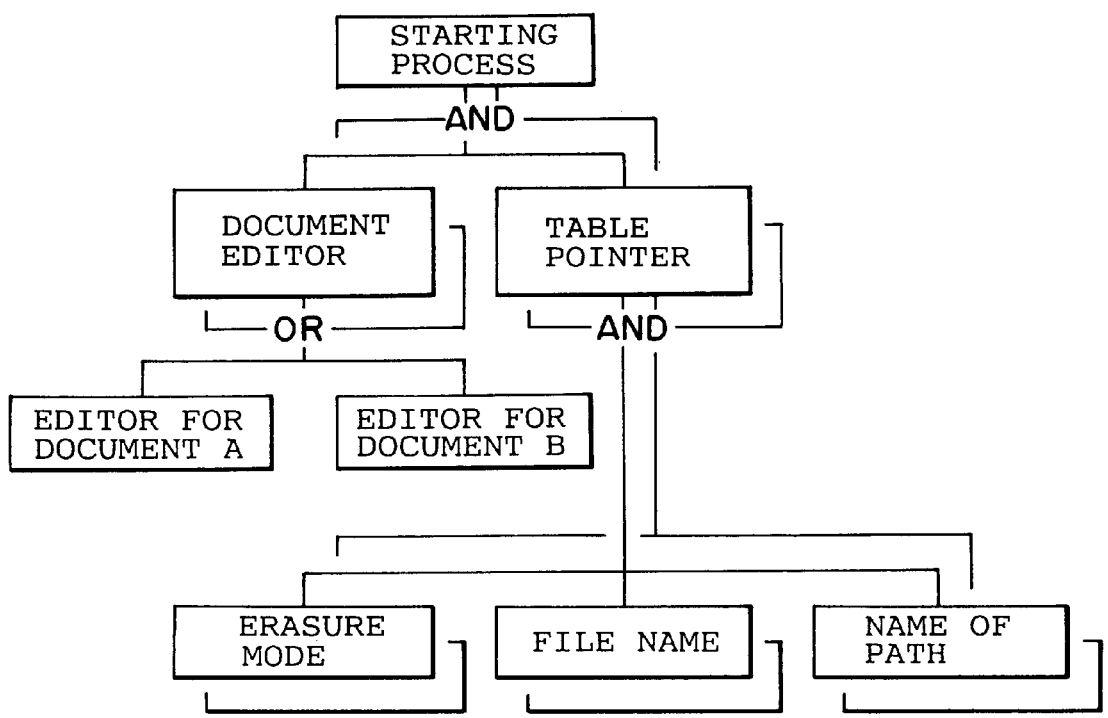
FIG. 31 is a block diagram of the hierarchical structure of an editor starting process used in Example 8.

FIG. 30 illustrates the procedure for performing an editing work about an associated document. In particular, the editor for editing the document is erased from the contents of the interlocking work. Also, the name of the storage file and the storage location are determined from the contents of the interlocking work. A process for starting the editor is then found. FIG. 31 illustrates the data structure taken when the starting process is erasure of a document.

Specifically, the process starting control portion 4 uses the contents of an interlocking work as a search key (step 3001). Then, the control portion 4 determines the starting process from the relation (FIG. 7) between the contents of the interlocking work and the starting process, using the search key (step 3002). The relation is defined in the interlocking starting process correlating table.

At this time, erasure of an associated document in the starting process is taken as, the starting process (step 3003).

In the associated document erasure condition table pointer (FIG. 31), the form of erasure done on an editor (i.e., a combination of an erasure mode, a storage file name, and the name of a path to the storage location) is defined as the associated document erasure condition table 14. The conditions under which a document editor to be started are determined according to the present table (steps 3004–3006).

Thereafter, based on the erasure mode, storage file name, and name of path to the storage location which have been found in the steps 3004–3006, the starting process 58 acting as an erasure process is started (step 3007).

EXAMPLE 9

Figure 32:
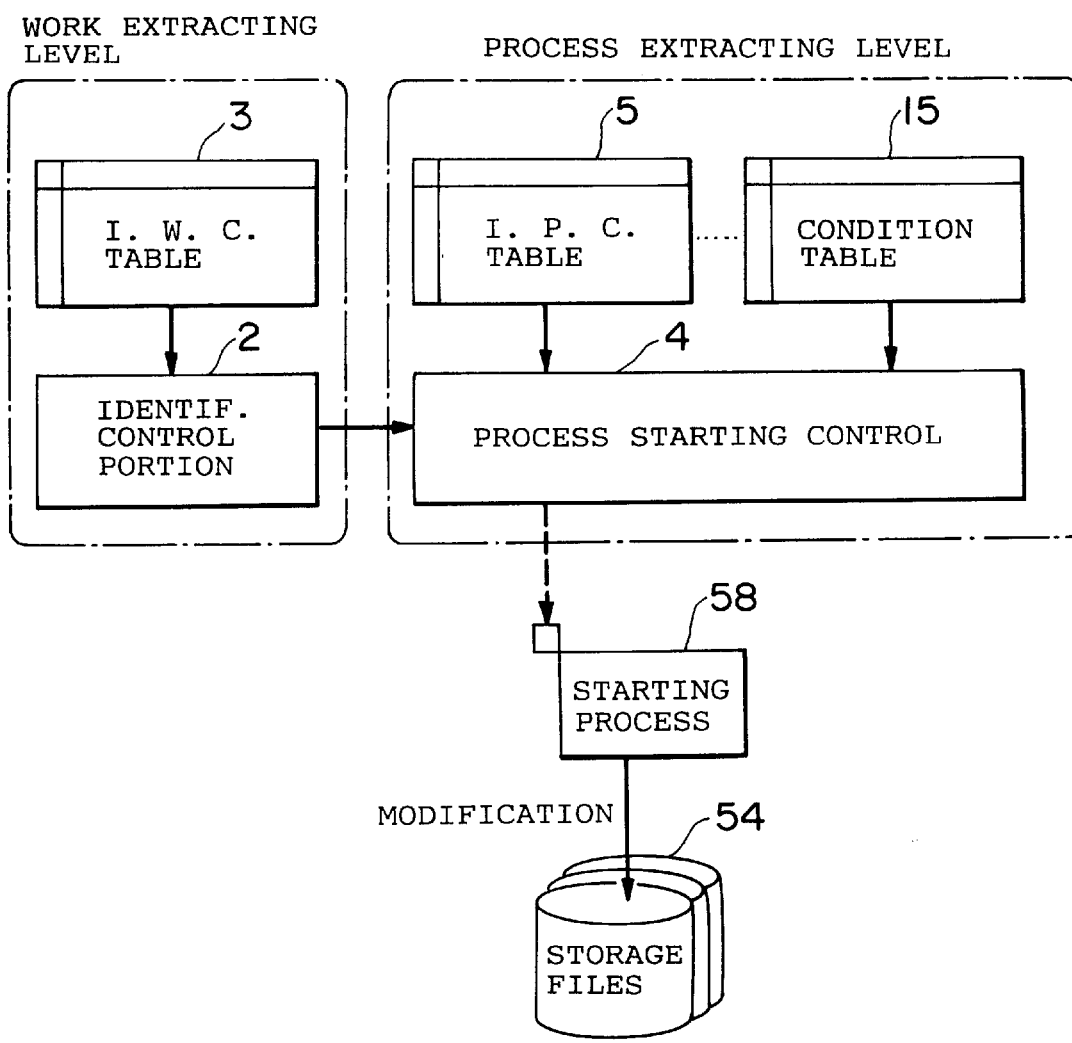
FIG. 32 is a block diagram of the system structure of Example 9 of the invention.

FIG. 32 illustrates the structure of the system of Example 9. The present example is characterized in that the process starting control portion 4 has the associated document modification condition table 15. In Example 9, if the result of the collation with the interlocking work starting process correlating table 5 made by the process starting control portion 4 is a process associated with a modification of the associated document, then modification conditions related to the modified process are extracted from the associated document modification condition table 15. Based on the extracted conditions, parameters for the modification to the process such as a path to the storage location in which editing information files are stored and file names can be established. The modification to the editing information storage files 54 for the associated document is reflected in step with a modification operation on a given document.

Figure 33:
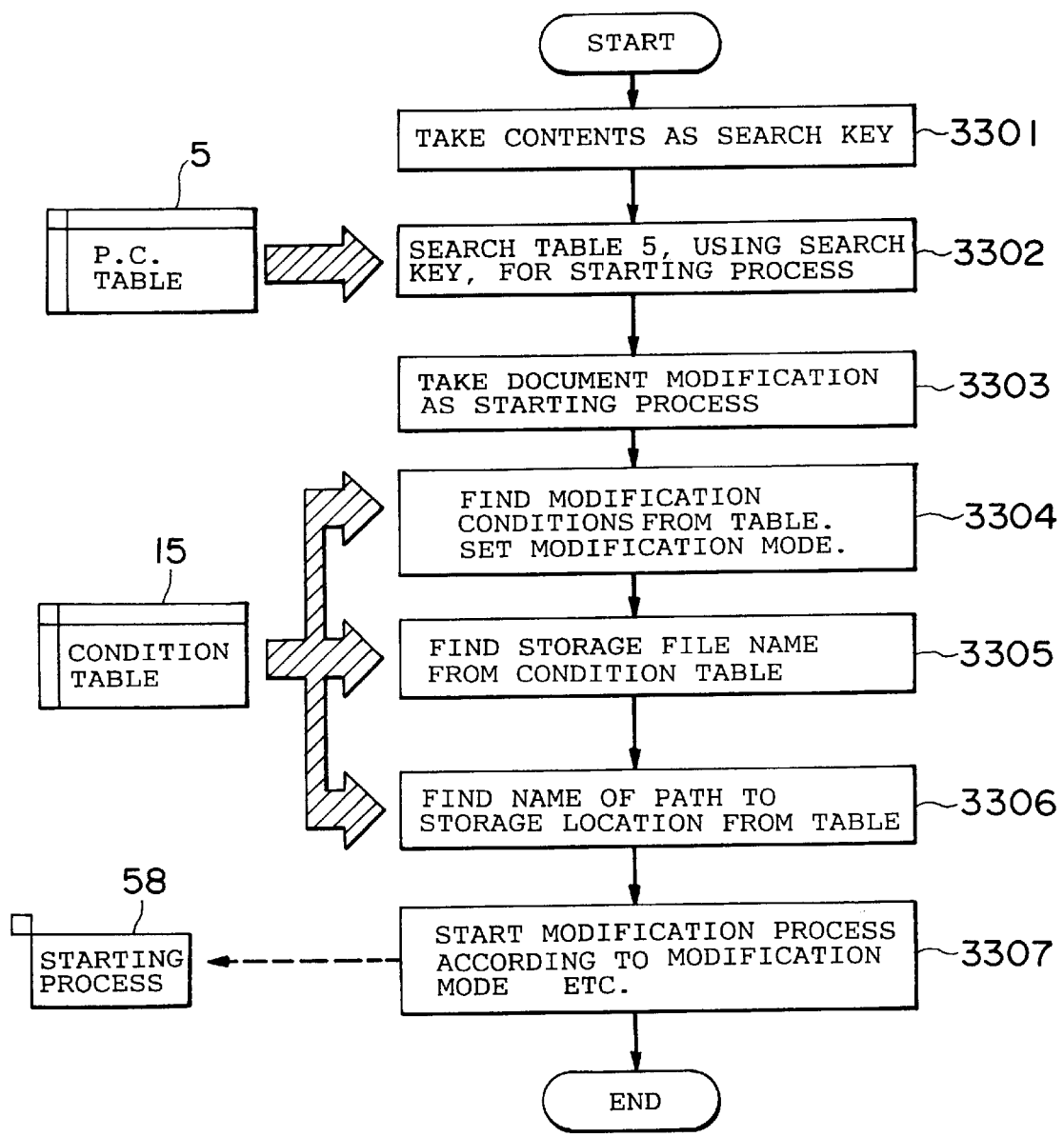
FIG. 33 is a flowchart illustrating the processing of Example 9.
Figure 34:
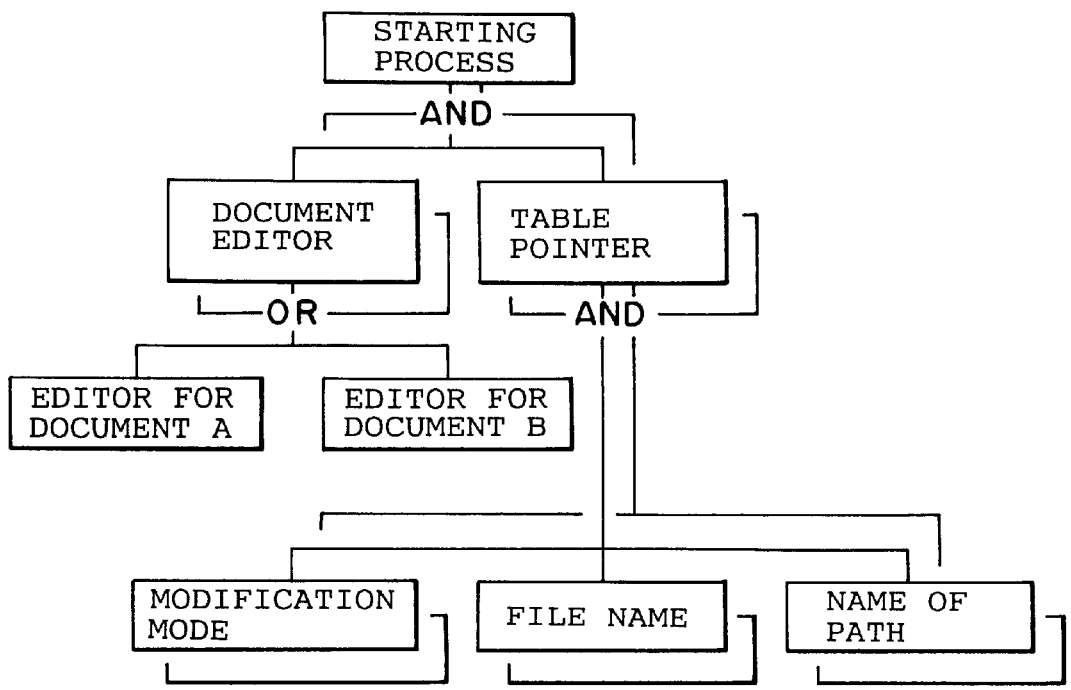
FIG. 34 is a block diagram of the data structure of information used to modify associated documents in Example 9.

FIG. 33 illustrates the procedure for performing an editing work about an associated document. In particular, modification to the editor for editing the document is determined from the contents of the interlocking work. Also, the name of the storage file and the storage location are determined from the contents of the interlocking work. Then, a starting process for the editor is found. FIG. 34 illustrates the data structure taken when the starting process is a modification to a document. Specifically, the process starting control portion 4 uses the contents of an interlocking work as a search key (step 3301). Then, the control portion 4 determines the starting process from the relation (FIG. 7) between the contents of the interlocking work and the starting process, using the search key (step 3302). The relation is defined in the interlocking starting process correlating table.

At this time, a modification to an associated document in the starting process is taken as the starting process (step 3303).

As illustrated in FIG. 34, the starting process is composed of "editors for editing documents" and a "document modification condition table pointer" (the associated document modification condition table 15). A decision is made as to for which document should a modification process be started, using the "editors for editing documents". In the document modification condition table 15, a combination of a modification mode for a document (3304), the name of a storage file (3305), and the name of a path to the storage location (3306) is defined. The document to be modified is determined from the present table.

Thereafter, based on the modification mode, storage file name, and name of path to the storage location which have been found in the steps 3304–3306, the starting process 58 acting as a modification process is started (step 3307).

EXAMPLE 10

Figure 35:
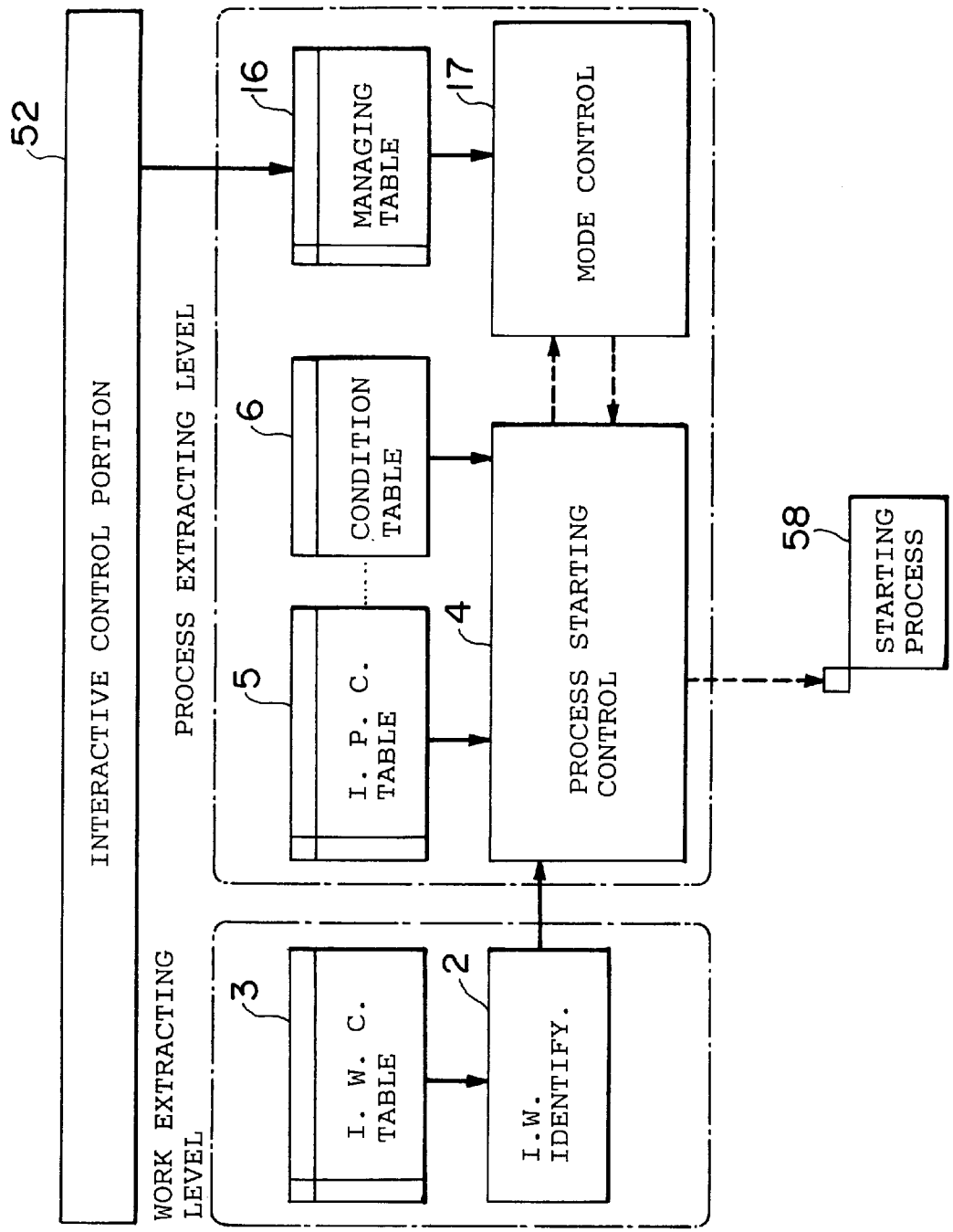
FIG. 35 is a block diagram of the system structure of Example 10 of the invention.

FIG. 35 illustrates the structure of the system of Example 10. The present example is characterized in that the interlocking operation mode control portion 17 and the interlocking operation mode managing table 16 are provided for the process starting control portion 4. Data is read from the managing table 16 by the control portion 17.

On receiving information about an editing operation, the process starting control portion 4 causes the interlocking operation control portion 17 to collate the information with the interlocking operation mode managing table 16. If the system is so set that no work is done in an interlocking manner with the operation, then processing for starting the subsequently interlocking processes is discontinued. The user 51 can perform closed processing relating only to the editing operation on the corresponding document by previously registering such a mode in the interlocking operation mode managing table 16 which should be made non-interlocking.

Figure 36:
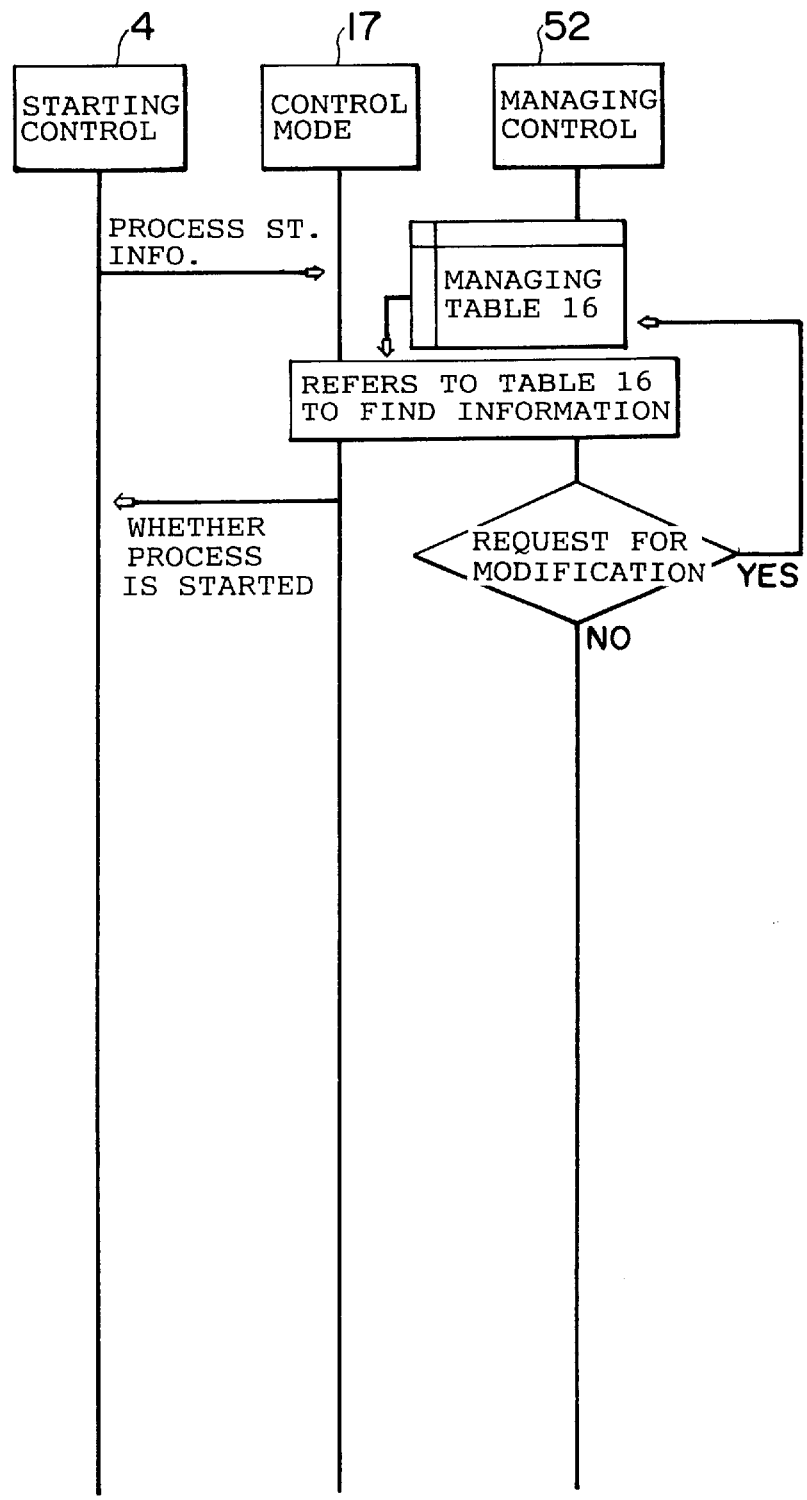
FIG. 36 is a flowchart illustrating a series of operations performed by components of Example 10.

FIG. 36 illustrates the sequence which is started when information about an editing operation is received by the interlocking operation control portion 17 from the process starting control portion 4. The sequence ends when a decision is made as to whether an associated process should be started or not.

Figure 37:
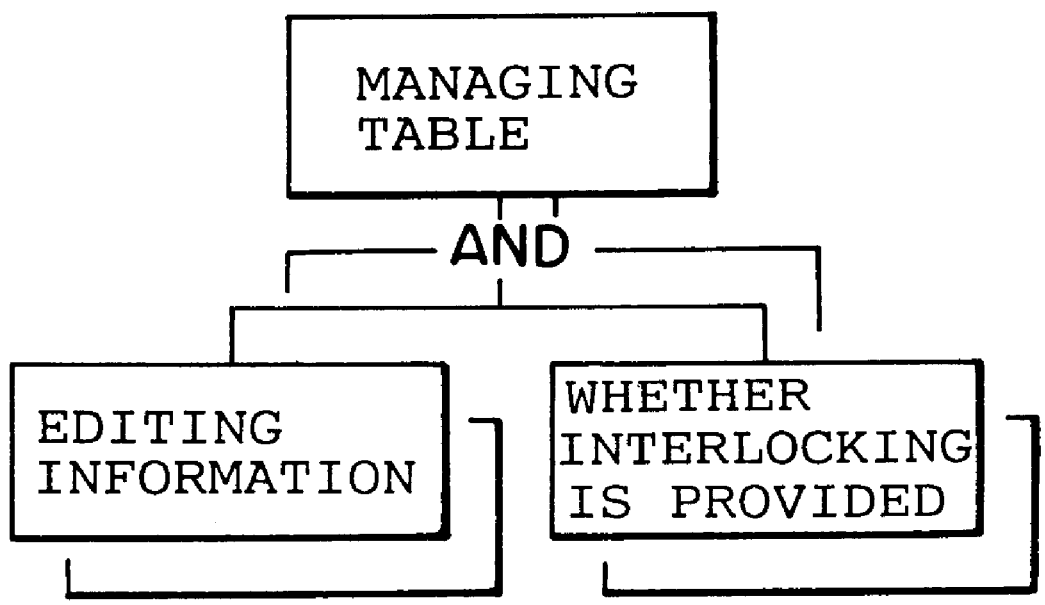
FIG. 37 is a block diagram of the structure of an interlocking operation mode managing table used in Example 10.

The user 51 previously defines information indicating whether interlock is provided or not in the interlocking operation mode managing table 16, through the interactive managing-and-controlling portion 52. The managing table 16 is organized as illustrated in FIG. 37 and comprised of "information about editing" and "information indicating whether interlock is provided or not". That is, the interactive managing-and-controlling portion 52 keeps monitoring the presence or absence of a request for a modification to an interlocking operation. If such a request is caused, the interlocking operation mode managing table, or the information indicating whether interlock is provided or not, is rewritten.

On the other hand, if the process starting control portion 4 receives the information about an editing operation, then the control portion 4 informs the interlocking operation control portion 17 of the information about starting of a process. In response to the informed information, the control portion 17 refers to the interlocking operation mode managing table 16, finds information indicating whether interlocking is provided or not from the information about an editing operation, and returns the result to the process starting control portion 4.

The process starting control portion 4 makes a decision as to whether the associated process (the starting process 58) should be started, based on the above-described result.

EXAMPLE 11

Figure 38:
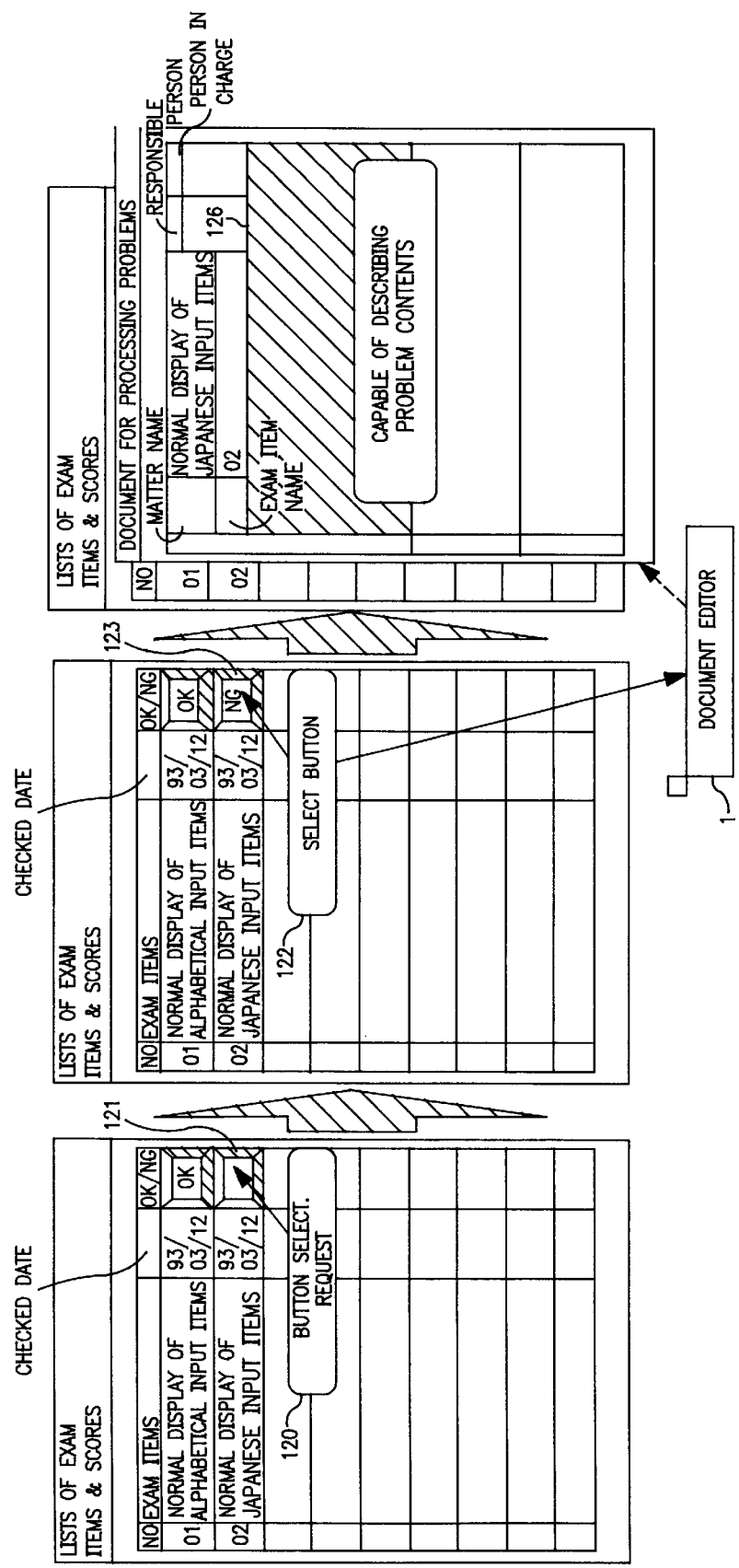
FIG. 38 is a diagram illustrating a series of images displayed on a display screen and undergoing processing where the invention is applied to a testing work.
Figure 39:
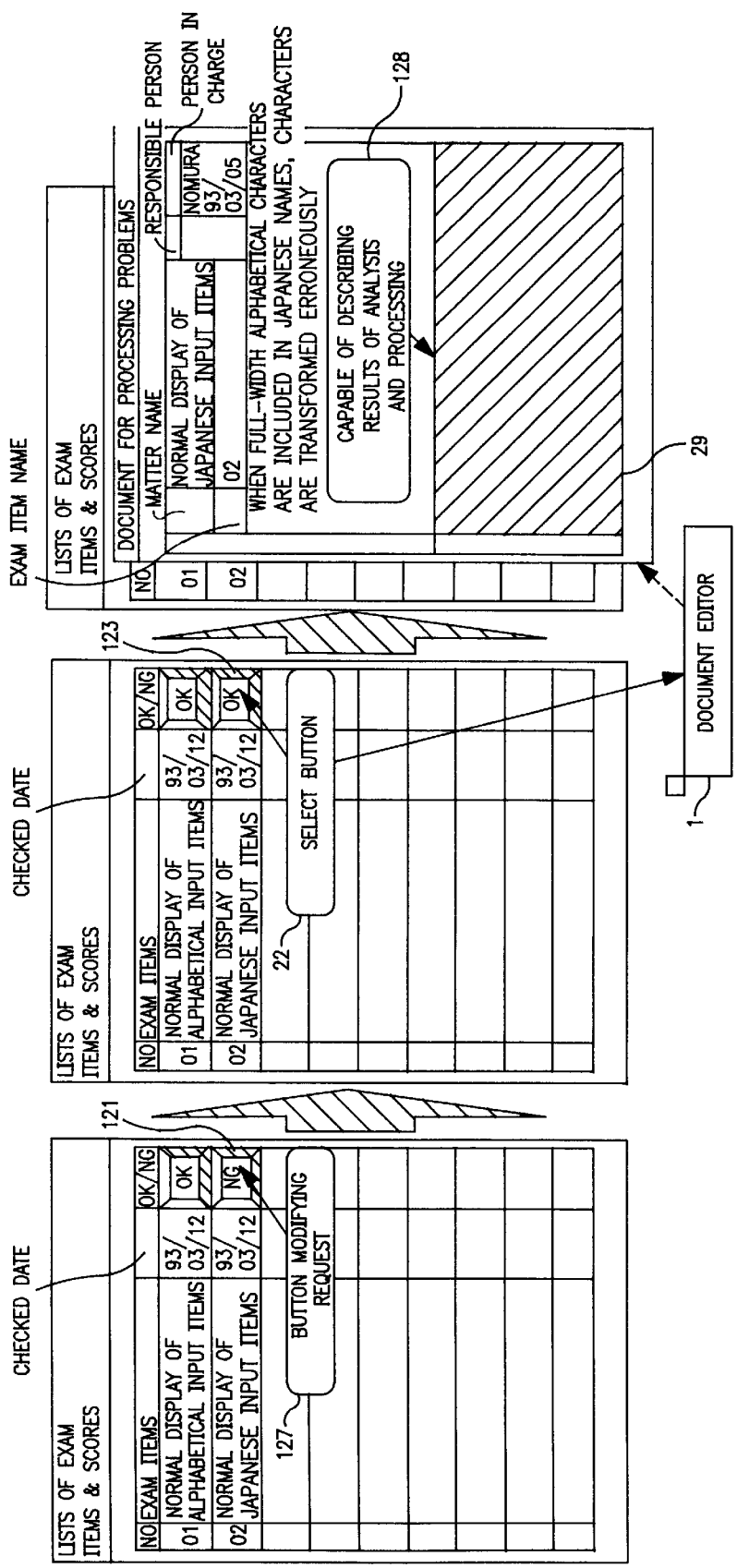
FIG. 39 is a diagram illustrating another series of images displayed on a display screen and undergoing processing where the invention is applied to a testing work.
Figure 40:
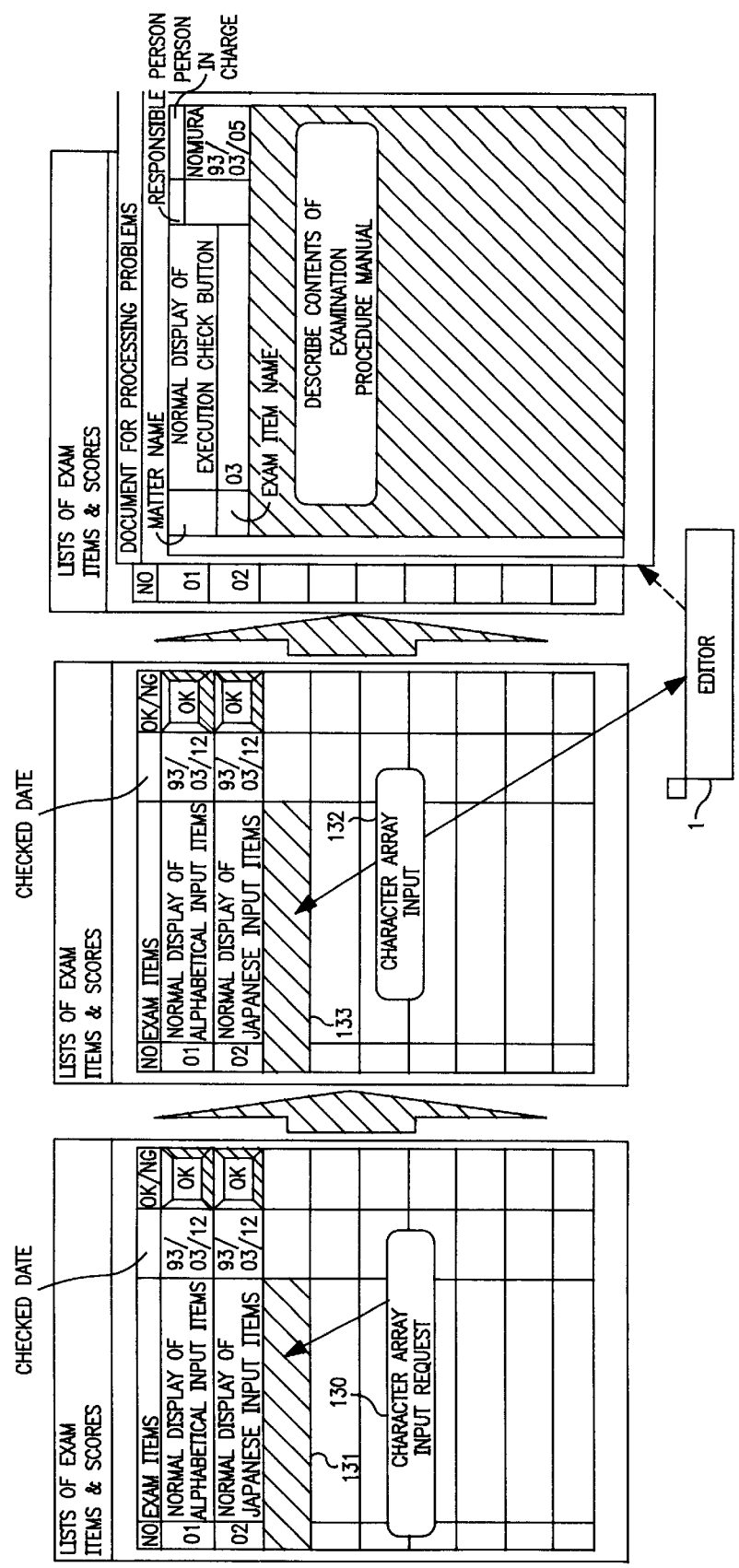
FIG. 40 is a diagram illustrating a further series of images displayed on a display screen and undergoing processing where the invention is applied to a testing work.

FIGS. 38, 39, and 40 show successive images displayed on the display screen when editors automatically open documents necessary for processing of testing according to working procedures in the examples described thus far. The documents include a list of items of an examination, scores in the examination, documents for processing problems, and examination procedure manuals.

FIG. 38 illustrates the manner in which a problem-processing document corresponding to one examination item is opened to describe the contents of a problem occurring simultaneously with entry of the results of the examination. The problem takes place when the examination item is being digested.

Referring to FIG. 38, the examination item producing the problem with the lists of items of an examination and scores in the examination has a column 121 to which results should be written. To describe the results, the user 51 informs the corresponding document editor 1 of a button selecting request 120. NG is selected as a selected button 123. At the same time, the editor 1 for the problematic document processed is started. Thus, the problematic document corresponding to the corresponding examination item is opened so as to be capable of edited.

In the example of FIG. 39, the problematic examination item is processed, and the contents of the examination item are proved to be correct. Then, the result of the check of the examination item is modified to OK. To describe the results of the analysis of the problem and the contents of the processing, a problem-processing document corresponding to the examination item is opened as illustrated.

The examination item for which the problem has been solved has the column 121 to which the results are written. The user 51 issues a selected button modifying request 127 to perform button selection 22, thus switching the selected button from the NG to OK. At the same time, the editor 1 for the problem-processing document is started. This permits the problem-processing document corresponding to the examination item to be edited.

In the example of FIG. 40, as a work for adding an examination item, an additional examination item is written to an examination item entry column 131. As a result, an examination procedure manual corresponding to the examination item is opened.

In FIG. 40, in order to permit the user 51 to enter the contents of an examination in the examination item entry column 131, the editors 1 are informed of a character array input request 130. Simultaneously with character array input 132, the editor 1 for the examination procedure manual is started. This enables the examination procedure manual corresponding to the examination item 133 to be edited.

Figure 41:
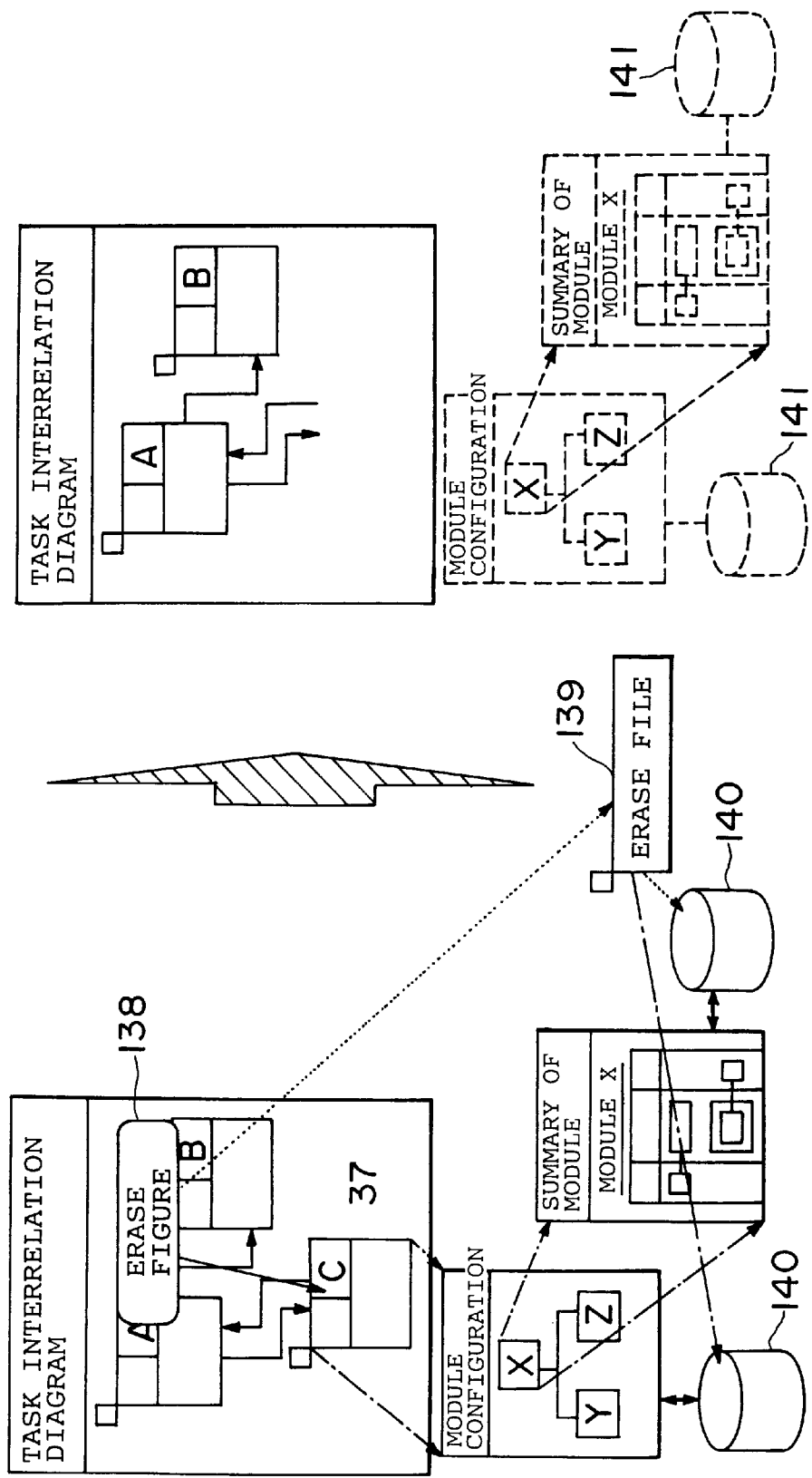
FIG. 41 is a diagram illustrating the manner in which a request for erasing a graphic figure from a higher-level document is reflected in lower-level documents where the invention is applied to a testing work.

In FIG. 41, various documents are at different levels of hierarchy. The user 51 issues a graphic figure erasing request 137 to erase a graphic figure 138 from a higher-level document. As a result, lower-level documents are made unnecessary. An assisting process 139 for erasing all editing information storage files 140 in which the lower-level documents are stored is started. In consequence, the files are erased.

What is claimed is:

1. An information-processing apparatus comprising:

editor means for editing a plurality of types of documents according to a type of each document;

an editing operation interlocking work identifying-and-controlling means for identifying interlocking work information, indicating an operation to be executed by a user, based on an editing operation being performed upon a document and a modification history up to the performance of the editing operation;

an editing operation interlocking work correlating table in which information about editing operations and information about an associated work being processed in parallel with or later than said editing operations are registered, said editing operation interlocking work identifying-and-controlling means accessing said editing operation interlocking work correlating table to identify the interlocking work information using information about the editing operation as a search key;

a process starting control means for specifying a starting process in a computer for assisting said work according to said information about said associated work; and an interlocking work starting process correlating table, accessible by said process starting control means, in which said information about said associated work and starting processes are defined and registered, wherein said process starting control means accesses the interlocking work starting process correlating table to search the starting process using said interlocking work information as a search key.

2. The information-processing apparatus of claim 1, further comprising an editor starting condition table in which starting forms of the editors are registered, as well as said interlocking work starting process correlating table, and wherein if a given editing operation is carried out upon said editor and subsequently a second associated document is edited, said process starting control means reads editor starting conditions from said editor starting condition table and carries out an editing operation upon said second associated document.

3. The information-processing apparatus of claim 2, wherein said process starting control means has a process starting pattern table in which information about pattern of starting of processes is registered and a process starting pattern control means for informing said process starting control means of a starting pattern of a process according to said information registered in said process starting pattern table, and wherein if starting processes for editors for plural documents are defined in said interlocking work starting process correlating table, said process starting pattern control means judges whether all the defined starting processes should be started simultaneously or selectively.

4. The information-processing apparatus of claim 2, wherein said editing operation interlocking work identifying-and-controlling means has a graphic box editing operation identifying means for identifying placement of graphic boxes upon document editing images displayed upon a display screen and for editing of the graphic boxes upon the document editing images, said graphic boxes being previously set in said editors.

5. The information-processing apparatus of claim 2, wherein said editing operation interlocking work identifying-and-controlling means has a character array kind identifying means for identifying kinds of character arrays in a document after editing.

6. The information-processing apparatus of claim 5, wherein said character array kind identifying means includes a character array kind combination condition table in which patterns of combinations of character arrays produced before and after editing are defined, and wherein said character array kind identifying means further includes a character array kind combination condition collating means for transferring control to said process starting control means if the conditions defined in said character array kind combination condition table are satisfied.

7. The information-processing apparatus of claim 2, wherein said editing operation interlocking work identifying-and-controlling means has a graphic button operation identifying means for defining graphic buttons which are displayed upon a display screen and permit execution of certain functions when coordinates of certain regions upon said graphic buttons are indicated.

8. The information-processing apparatus of claim 1, further comprising an associated document erasure condition table where conditions under which a previously created document associated with a document to be edited is erased are defined, said associated document erasure condition table corresponding to said interlocking work starting process correlating table.

9. The information-processing apparatus of claim 1, further comprising an associated document modification condition table where conditions under with a previously created document associated with a document to be edited are modified and defined, said associated document modification condition table corresponding to said interlocking work starting process correlating table.

10. The information-processing apparatus of claim 1, further comprising:

an interlocking operation mode control means for indicating to said process starting control means whether another process associated with a currently edited document is started; and an interlocking operation mode managing table for determining whether another associated process should be started in an interlocking manner with editing of a document.

* * * * *